United States Patent
Leininger et al.

(10) Patent No.: US 9,784,121 B2
(45) Date of Patent: Oct. 10, 2017

(54) SYSTEM AND METHOD FOR CONTINUOUS SOLIDS SLURRY DEPRESSURIZATION

(71) Applicant: General Electric Company, Schenectady, NY (US)

(72) Inventors: Thomas Frederick Leininger, Chino Hills, CA (US); Raymond Douglas Steele, Cypress, TX (US); Hsien-Chin William Yen, Sugar Land, TX (US); Stephen Michael Cordes, Cypress, TX (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 170 days.

(21) Appl. No.: 14/566,581

(22) Filed: Dec. 10, 2014

(65) Prior Publication Data

US 2015/0159503 A1 Jun. 11, 2015

Related U.S. Application Data

(60) Provisional application No. 61/914,919, filed on Dec. 11, 2013.

(51) Int. Cl.
F01D 21/00 (2006.01)
F01D 1/02 (2006.01)
(Continued)

(52) U.S. Cl.
CPC ............ *F01D 21/006* (2013.01); *C10J 3/526* (2013.01); *C10J 3/723* (2013.01); *F01D 1/02* (2013.01);
(Continued)

(58) Field of Classification Search
CPC combination set(s) only.
See application file for complete search history.

(56) References Cited

U.S. PATENT DOCUMENTS

| 1,459,923 A | 6/1923 | Nagel |
| 1,813,575 A | 7/1931 | Janecke et al. |

(Continued)

FOREIGN PATENT DOCUMENTS

| CN | 86104452 A | 4/1987 |
| CN | 101525118 A | 9/2009 |

(Continued)

OTHER PUBLICATIONS

International Search Report and Written Opinion issued in connection with corresponding PCT Application No. PCT/US2014/069708 dated Feb. 25, 2015.

(Continued)

*Primary Examiner* — Kaity Chandler
(74) *Attorney, Agent, or Firm* — Fletcher Yoder P.C.

(57) ABSTRACT

A continuous slag processing system includes a rotating parallel disc pump, coupled to a motor and a brake. The rotating parallel disc pump includes opposing discs coupled to a shaft, an outlet configured to continuously receive a fluid at a first pressure, and an inlet configured to continuously discharge the fluid at a second pressure less than the first pressure. The rotating parallel disc pump is configurable in a reverse-acting pump mode and a letdown turbine mode. The motor is configured to drive the opposing discs about the shaft and against a flow of the fluid to control a difference between the first pressure and the second pressure in the reverse-acting pump mode. The brake is configured to resist rotation of the opposing discs about the shaft to control the difference between the first pressure and the second pressure in the letdown turbine mode.

14 Claims, 9 Drawing Sheets

(51) Int. Cl.
| | |
|---|---|
| *C10J 3/52* | (2006.01) |
| *F04D 5/00* | (2006.01) |
| *F04D 7/04* | (2006.01) |
| *F03B 5/00* | (2006.01) |
| *C10J 3/72* | (2006.01) |
| *F04D 15/00* | (2006.01) |
| *C10J 3/48* | (2006.01) |

(52) U.S. Cl.
CPC ............... *F03B 5/00* (2013.01); *F04D 5/001* (2013.01); *F04D 7/04* (2013.01); *F04D 15/0066* (2013.01); *C10J 3/485* (2013.01); *C10J 2300/1628* (2013.01); *F04D 15/0038* (2013.01); *Y02E 10/20* (2013.01)

(56) References Cited

U.S. PATENT DOCUMENTS

| | | |
|---|---|---|
| 2,873,032 A | 2/1959 | Henry |
| 3,035,306 A | 5/1962 | Rossiter |
| 3,305,091 A | 2/1967 | Brady |
| 3,602,552 A | 8/1971 | Morgan |
| 3,841,465 A | 10/1974 | Miller et al. |
| 3,865,727 A | 2/1975 | Broling et al. |
| 3,875,051 A | 4/1975 | Kovarik |
| 3,882,946 A | 5/1975 | Ioannesian |
| 3,944,380 A | 3/1976 | Kampe |
| 3,992,784 A | 11/1976 | Verschuur et al. |
| 4,017,270 A | 4/1977 | Funk et al. |
| 4,106,533 A | 8/1978 | Herzig |
| 4,126,519 A | 11/1978 | Murray |
| 4,176,465 A | 12/1979 | Murray et al. |
| 4,204,955 A | 5/1980 | Armstrong |
| 4,236,868 A | 12/1980 | Linhardt |
| 4,292,991 A | 10/1981 | Wing |
| 4,313,737 A | 2/1982 | Massey et al. |
| 4,322,389 A | 3/1982 | Schmid et al. |
| 4,377,392 A | 3/1983 | Massey et al. |
| 4,434,028 A | 2/1984 | Eppig et al. |
| 4,472,171 A | 9/1984 | Broderick |
| 4,477,257 A | 10/1984 | Koppelman et al. |
| 4,516,674 A | 5/1985 | Firth et al. |
| 4,666,464 A | 5/1987 | Najjar et al. |
| 4,668,130 A | 5/1987 | Sharp |
| 4,701,266 A | 10/1987 | Janka et al. |
| 4,765,781 A | 8/1988 | Wilks et al. |
| 4,801,210 A | 1/1989 | Gian |
| 4,828,581 A | 5/1989 | Feldmann et al. |
| 4,907,565 A | 3/1990 | Bailey et al. |
| 4,967,673 A | 11/1990 | Gunn |
| 5,050,375 A | 9/1991 | Dickinson |
| 5,051,041 A | 9/1991 | Firth et al. |
| 5,102,237 A | 4/1992 | Ide |
| 5,188,741 A | 2/1993 | Zang et al. |
| 5,223,144 A | 6/1993 | Woyciesjes et al. |
| 5,223,199 A | 6/1993 | Ponzielli |
| 5,269,635 A | 12/1993 | Taylor, Jr. |
| 5,355,993 A | 10/1994 | Hay et al. |
| 5,356,280 A | 10/1994 | Ponzielli |
| 5,381,886 A | 1/1995 | Hay et al. |
| 5,402,876 A | 4/1995 | Hay et al. |
| 5,443,162 A | 8/1995 | Sherman |
| 5,459,674 A | 10/1995 | Ide et al. |
| 5,485,909 A | 1/1996 | Hay et al. |
| 5,495,674 A | 3/1996 | Taylor |
| 5,497,872 A | 3/1996 | Pennino et al. |
| 5,551,553 A | 9/1996 | Hay et al. |
| 5,657,704 A | 8/1997 | Schueler |
| 5,685,153 A | 11/1997 | Dickinson et al. |
| 5,753,075 A | 5/1998 | Stromberg et al. |
| 5,797,332 A | 8/1998 | Keller et al. |
| 5,823,235 A | 10/1998 | Alley et al. |
| 5,836,524 A | 11/1998 | Wang |
| 5,853,488 A | 12/1998 | Silver |
| 6,090,423 A | 7/2000 | Wetzel |
| 6,141,796 A | 11/2000 | Cummings |
| 6,213,033 B1 | 4/2001 | Manelis et al. |
| 6,213,289 B1 | 4/2001 | Hay et al. |
| 6,280,638 B1 | 8/2001 | Belchev |
| 6,375,841 B1 | 4/2002 | Nemedi et al. |
| 6,398,921 B1 | 6/2002 | Moraski |
| 6,640,696 B2 | 11/2003 | Shinobudani et al. |
| 6,706,199 B2 | 3/2004 | Winter et al. |
| 6,841,042 B2 | 1/2005 | Stromberg et al. |
| 7,074,339 B1 | 7/2006 | Mims |
| 7,229,524 B2 | 6/2007 | Snekkenes |
| 7,374,734 B2 | 5/2008 | Grossman et al. |
| 7,493,969 B2 | 2/2009 | Burnett et al. |
| 7,562,777 B1 | 7/2009 | Seenivasan |
| 7,731,783 B2 | 6/2010 | Sprouse et al. |
| 7,745,568 B2 | 6/2010 | Vandaele |
| 8,434,641 B2 | 5/2013 | Coughlin et al. |
| 8,470,183 B2 | 6/2013 | DeWaard |
| 8,496,412 B2 | 7/2013 | Livingood, III et al. |
| 8,561,319 B2 | 10/2013 | He |
| 8,926,231 B2 | 1/2015 | Liu et al. |
| 8,926,846 B2 | 1/2015 | DeWaard |
| 8,951,314 B2 | 2/2015 | Leininger et al. |
| 8,992,641 B2 | 3/2015 | Leininger et al. |
| 9,156,631 B2 | 10/2015 | Stevenson |
| 9,181,046 B2 | 11/2015 | Stevenson |
| 9,222,040 B2 | 12/2015 | Steele et al. |
| 2001/0026783 A1 | 10/2001 | Winter et al. |
| 2001/0032780 A1 | 10/2001 | Winter et al. |
| 2002/0110296 A1 | 8/2002 | Smith et al. |
| 2002/0130086 A1 | 9/2002 | Miura |
| 2004/0107700 A1 | 6/2004 | McClanahan et al. |
| 2005/0107648 A1 | 5/2005 | Kimura et al. |
| 2005/0177013 A1 | 8/2005 | Countz |
| 2006/0096163 A1 | 5/2006 | Dickinson et al. |
| 2006/0130357 A1 | 6/2006 | Long, Jr. |
| 2006/0165582 A1 | 7/2006 | Brooker et al. |
| 2006/0166810 A1 | 7/2006 | Gunderman et al. |
| 2008/0045762 A1 | 2/2008 | Foody et al. |
| 2008/0145156 A1 | 6/2008 | Livingood et al. |
| 2008/0251454 A1 | 10/2008 | Waibel |
| 2008/0287277 A1 | 11/2008 | Pallmann |
| 2009/0107046 A1 | 4/2009 | Leininger et al. |
| 2009/0178338 A1 | 7/2009 | Leininger et al. |
| 2009/0217666 A1 | 9/2009 | Farkaly |
| 2010/0242354 A1 | 9/2010 | Perkins et al. |
| 2011/0068063 A1 | 3/2011 | Mallonee et al. |
| 2011/0072723 A1 | 3/2011 | Liu et al. |
| 2011/0091953 A1 | 4/2011 | Bolin et al. |
| 2011/0100359 A1 | 5/2011 | North |
| 2011/0139257 A1 | 6/2011 | Bielenberg et al. |
| 2011/0171114 A1 | 7/2011 | Shaw |
| 2011/0232191 A1 | 9/2011 | Diebold et al. |
| 2011/0251440 A1 | 10/2011 | Huegle et al. |
| 2012/0067047 A1 | 3/2012 | Peterson et al. |
| 2012/0067702 A1 | 3/2012 | Frey et al. |
| 2012/0171054 A1 | 7/2012 | Russell |
| 2012/0198768 A1 | 8/2012 | Khosravian et al. |
| 2012/0205222 A1 | 8/2012 | Russell et al. |
| 2012/0234652 A1 | 9/2012 | Stevenson et al. |
| 2012/0255706 A1 | 10/2012 | Tadayon et al. |
| 2012/0282467 A1 | 11/2012 | Iyer et al. |
| 2013/0019530 A1 | 1/2013 | Favilli et al. |
| 2013/0098765 A1 | 4/2013 | Stradi |
| 2013/0126002 A1 | 5/2013 | Bathurst |
| 2013/0255143 A1 | 10/2013 | Frey et al. |
| 2013/0259671 A1 | 10/2013 | Leininger |
| 2013/0269735 A1 | 10/2013 | Roetzel |
| 2013/0276822 A1 | 10/2013 | Plavidal |
| 2013/0295628 A1 | 11/2013 | Retsina et al. |
| 2013/0327028 A1 | 12/2013 | Steele et al. |
| 2014/0027246 A1 | 1/2014 | Stevenson et al. |
| 2014/0110320 A1 | 4/2014 | Thomas |
| 2014/0123973 A1 | 5/2014 | North |
| 2014/0150288 A1 | 6/2014 | Leininger et al. |
| 2014/0150873 A1 | 6/2014 | Stevenson et al. |
| 2014/0151191 A1 | 6/2014 | Stevenson et al. |

(56) References Cited

U.S. PATENT DOCUMENTS

| | | |
|---|---|---|
| 2015/0090938 A1 | 4/2015 | Meyer et al. |
| 2015/0159097 A1 | 6/2015 | Yen et al. |
| 2015/0159654 A1 | 6/2015 | Leininger |

FOREIGN PATENT DOCUMENTS

| | | |
|---|---|---|
| CN | 101952658 A | 1/2011 |
| EP | 0256186 A1 | 2/1988 |
| EP | 0343620 A2 | 11/1989 |
| EP | 0418442 A1 | 3/1991 |
| EP | 0646746 A2 | 4/1995 |
| EP | 1500863 A2 | 1/2005 |
| EP | 1256375 B1 | 1/2011 |
| EP | 2386621 A2 | 11/2011 |
| FR | 2811380 B1 | 10/2002 |
| GB | 191024001 A | 7/1911 |
| GB | 1457839 | 12/1976 |
| PL | 404251 A1 | 12/2013 |
| RU | 2376493 C2 | 12/2009 |
| RU | 2421612 C1 | 6/2011 |
| WO | WO 96/24810 | 8/1996 |
| WO | WO 98/25027 A1 | 6/1998 |
| WO | WO 99/43954 A1 | 9/1999 |
| WO | WO 00/53924 A1 | 9/2000 |
| WO | WO 02/02935 A1 | 1/2002 |
| WO | WO 03/067082 A1 | 8/2003 |
| WO | WO 2011/121423 A2 | 10/2011 |
| WO | 2011139164 A1 | 11/2011 |
| WO | 2012040110 A2 | 3/2012 |
| WO | WO 2013/087521 A2 | 6/2013 |

OTHER PUBLICATIONS

Perry, Robert H., Process Machinery Drives: Expansion Turbines, Perry's Chemical Engineers' Handbook, Sixth Edition, 1984, pp. 24-32 thru 24-37.

Stamet Inc., Continuous Mechanically Controlled Solids Ash Metering from High to Low Gas Pressure, SBIR/STTR, http://www.sbir.gov/sbirsearch/detail/316954, 1997; 2 pages.

SYSTEM AND METHOD FOR CONTINUOUS SOLIDS SLURRY DEPRESSURIZATION

CROSS-REFERENCE TO RELATED APPLICATION

This application claims priority to and benefit of U.S. Provisional Patent Application No. 61/914,919, entitled "SYSTEM AND METHOD FOR CONTINUOUS SOLIDS SLURRY DEPRESSURIZATION," filed Dec. 11, 2013, which is hereby incorporated by reference in its entirety for all purposes.

STATEMENT REGARDING FEDERALLY SPONSORED RESEARCH & DEVELOPMENT

This invention was made with Government support under contract number DE-FE0007859 awarded by the Department of Energy. The Government has certain rights in the invention.

BACKGROUND

The subject matter disclosed herein relates to a slag handling system, and, more particularly, to a continuous slag handling system.

An industrial process may utilize a slurry, or fluid mixture of solid particles suspended in a liquid (e.g., water), to convey the solid particles through the respective process. For example, partial oxidation systems may partially oxidize carbon-containing compounds in an oxygen-containing environment to generate various products and by-products. For example, gasifiers may convert carbonaceous materials into a useful mixture of carbon monoxide and hydrogen, referred to as synthesis gas or syngas. In the case of an ash-containing carbonaceous material, the resulting syngas may also include less desirable components, such as molten ash, also known as molten slag, which may be removed from the gasifier along with the useful syngas produced. Accordingly, the molten slag byproduct produced in the gasifier reactions may be directed into a gasifier quench liquid in order to solidify the molten slag and to create a slurry. Generally, this slurry is discharged from the gasifier at elevated temperatures and high pressures. The slurry discharged from the gasifier is depressurized to enable the disposal of, or the further processing of, the slurry.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a continuous slag processing system includes a first rotating parallel disc pump having opposing discs coupled to a first shaft, a first outlet configured to continuously receive a fluid at a first pressure, and a first inlet configured to continuously discharge the fluid at a second pressure less than the first pressure. The first rotating parallel disc pump is configurable in a reverse-acting pump mode and a letdown turbine mode. The continuous slag processing system includes a first motor coupled to the first rotating parallel disc pump that is configured to drive the opposing discs of the first rotating parallel disc pump about the first shaft and against a flow of the fluid to control a difference between the first pressure and the second pressure in the reverse-acting pump mode. The continuous slag processing system includes a first brake coupled to the first rotating parallel disc pump that is configured to resist rotation of the opposing discs about the first shaft to control the difference between the first pressure and the second pressure in the letdown turbine mode.

In another embodiment, a gasification system includes a gasifier, a slag crusher coupled to the gasifier, a rotating parallel disc pump, a motor coupled to the rotating parallel disc pump, and a brake coupled to the rotating parallel disc pump. The gasifier is configured to react a carbonaceous feedstock into a mixture of a gas and slag. The gasifier includes a quench chamber configured to discharge the slag via a slag outlet. The slag crusher is configured to continuously receive the slag and a quench liquid at a first pressure from the slag outlet, to reduce a size of particles of the received slag, and to form a slag slurry at a first pressure with the reduced particles of the slag and the quench liquid. The rotating parallel disc pump includes opposing discs coupled to a shaft, an outlet configured to continuously receive the slag slurry at the first pressure, and an inlet configured to continuously discharge the slag slurry at a second pressure less than the first pressure. The rotating parallel disc pump is configurable in a reverse-acting pump mode and a letdown turbine mode. The motor is configured to drive the opposing discs of the rotating parallel disc pump about the shaft and against a flow of the slag slurry to control a difference between the first pressure and the second pressure in the reverse-acting pump mode. The brake is configured to resist rotation of the opposing discs about the shaft, and the brake is configured to control the difference between the first pressure and the second pressure in the letdown turbine mode.

In another embodiment, a method includes continuously receiving a slag slurry flow at a first outlet of a first rotating parallel disc pump and depressurizing the received slag slurry from a first pressure to a second pressure. Depressurizing includes resisting the flow of the slag slurry from the first outlet to a first inlet of the first rotating parallel disc pump. Resisting the flow of the slag slurry includes driving the first rotating parallel disc pump against the slag slurry flow via a first motor when the first rotating parallel disc pump is in a reverse-acting pump mode, and engaging a first brake coupled to a first shaft of the first rotating parallel disc pump when the first rotating parallel disc pump is in a letdown turbine mode.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
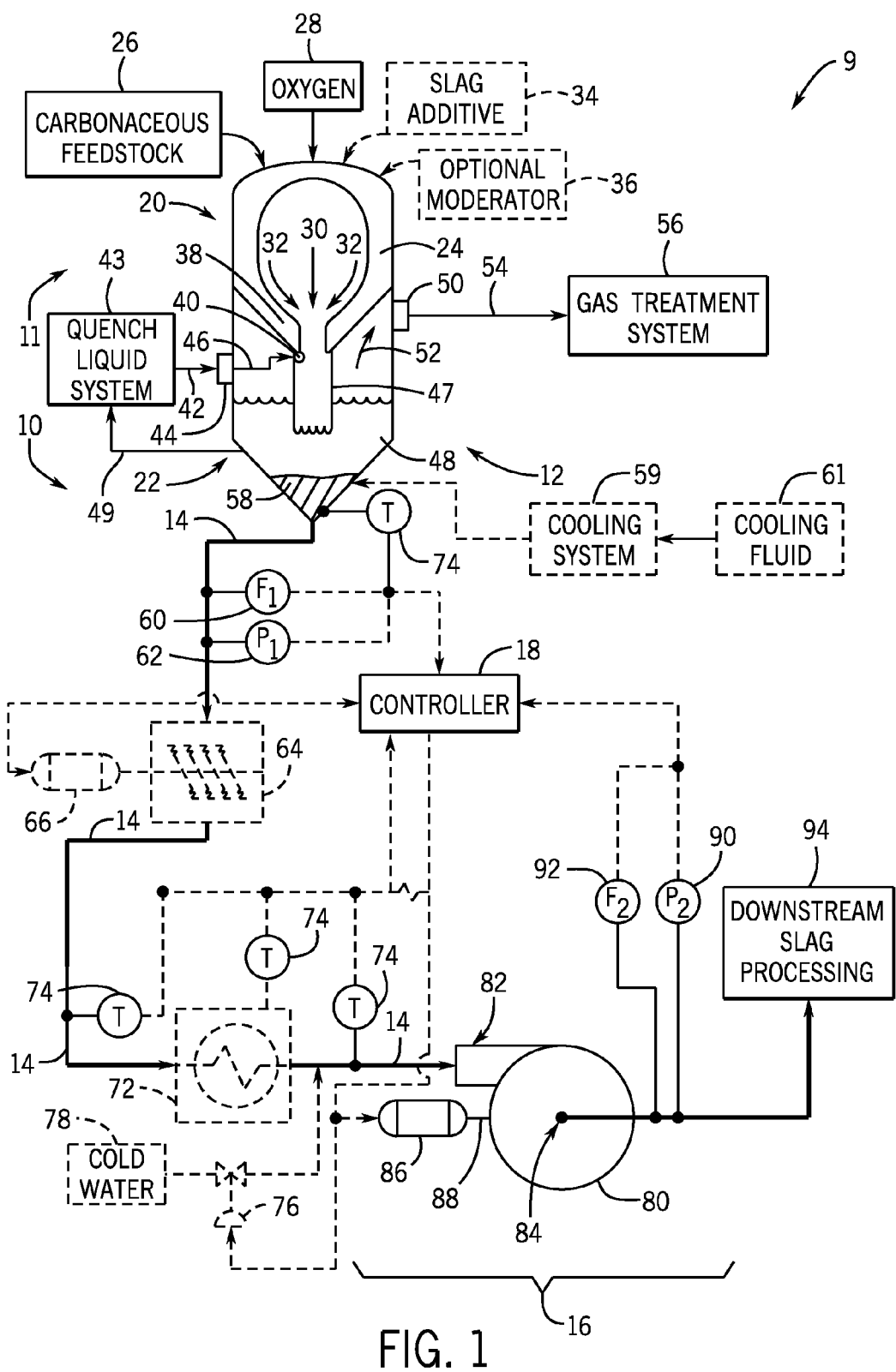
FIG. 1 is a schematic diagram of an embodiment of a continuous slag removal system with a depressurization system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Various industrial processes involve the handling of slurries. A slurry may include particulate solids dispersed in a fluid, such as water. In certain situations, the slurry is transported from a first location (e.g., vessel) to a second location. The slurry may be depressurized and/or cooled during transport from the first location to the second location. For example, the reaction chamber of a partial oxidation system (e.g., a gasifier) may receive a carbonaceous feedstock (e.g., a slurry of carbonaceous particulate solids such as coal or biomass, a pneumatically-conveyed stream of particulate solids, a liquid, a gas, or any combination thereof) and an oxidant, (e.g., high purity oxygen). In some embodiments, the reaction chamber may receive water (e.g., water spray or steam) to contribute to the slurry. The partial oxidation of the feedstock, the oxidant, and in some cases, water, may produce a useful gaseous product and an ash or a molten slag byproduct. For example, a gasifier may receive the feedstock, the oxygen, and the water to generate a synthetic gas, or syngas, and a molten slag. In certain cases, the molten slag may flow through the gasifier into a quench liquid, such as water, to create a slag slurry. The slag slurry discharged from the gasifier may be at a pressure between approximately 1000 to 10,000 kilopascals gauge (kPag) (e.g., approximately 145 pounds per square inch gauge (psig) to 1,450 psig). Before the slag slurry is further processed or disposed of, the slag slurry may be depressurized to a lower pressure, such as an atmospheric pressure. Depressurization of the slag slurry at elevated temperatures may cause vapor flash where at least a portion of the liquid (e.g., water) in the slag slurry evaporates. Accordingly, the slag slurry may be cooled prior to exiting the gasifier (e.g., via a cooling system coupled to a downstream end portion of the gasifier), or between the gasifier and a depressurization system (e.g., via a heat exchanger and/or injected cool water).

The disclosed embodiments move the slurry in a continuous process, rather than a batch process. Although a lock hopper system can effectively remove the slurry, it operates cyclically in a batch mode, occupies a large amount of vertical space, and may include expensive valves which may be subject to erosion. Valves of a lock hopper system may be limited in size and may not scale-up well to very large systems. Furthermore, the lock hopper system may use additional amounts of water, which may be removed during supplementary slurry processing. Thus, the disclosed embodiments include a depressurization system employing a reverse-acting pump to continuously reduce the pressure of a slag slurry and transport the slag slurry from a high pressure zone to a low pressure zone. As may be appreciated, the disclosed embodiments may consume less space than a batch process and may be implemented with smaller equipment than a batch process.

For example, the disclosed embodiments include a depressurization system that uses a reverse-acting pump to continuously reduce the pressure of the slurry. The reverse-acting pump drives at least a portion of the slurry against the net flow of the slurry through the reverse-acting pump from the outlet to the inlet. The reverse-acting pump utilizes rotating discs to drive at least a portion of the slurry near the surface of the rotating discs from the inlet to the outlet at a discharge pressure. The portion of the slurry driven to the outlet may recirculate back to the inlet with additional slurry from a high pressure system coupled to the outlet. The recirculated portion of the slurry and the additional slurry flow from the outlet to the inlet along a middle region between the rotating discs. The recirculated portion of the slurry and the additional slurry from the high pressure system coupled to the outlet may flow downstream through the inlet at a downstream pressure that is less than the pressure of the high pressure system. In other words, the reverse-acting pump drives the portion of the slurry from the inlet to the outlet to resist the net flow of the slurry from the outlet to the inlet. The resistance of the reverse-acting pump decreases the pressure of the slurry from the outlet to the inlet from the pressure of the high pressure system to the downstream pressure.

In certain embodiments, the depressurization system is used for continuous slag removal from partial oxidation systems or other pressurized slurry systems to reduce the initial pressure (e.g., upstream pressure) of the slurry to a lower pressure, such as an atmospheric pressure or a pressure that is sufficient to drive the depressurized slag slurry through the remainder of the slag slurry removal system (e.g., downstream slag processing system).

With the foregoing in mind, FIG. 1 is a schematic diagram of an embodiment of a system 9 having a gasification system 11 and a continuous slag removal system 10. As shown in FIG. 1, the continuous slag removal system 10 may include a slag slurry 14, a depressurization system 16 (e.g., one or more reverse-acting pumps), and a controller 18.

The gasification system 11 may include a partial oxidation system, such as a gasifier 12, which may further include a reaction chamber 20 and a quench chamber 22. A protective barrier 24 may enclose the reaction chamber 20, and may act as a physical barrier, a thermal barrier, a chemical barrier, or any combination thereof. Examples of materials that may be used for the protective barrier 24 include, but are not limited to, refractory materials, non-metallic materials, ceramics, and oxides of chromium, aluminum, silicon, magnesium, iron, titanium, zirconium, and calcium. In addition, the materials used for the protective barrier 24 may be in the form of bricks, castable refractory material, coatings, an actively cooled (e.g. water cooled) metal wall, or any combination thereof. In general, the reaction chamber 20 may provide a controlled environment for the partial oxidation chemical reactions to take place. Partial oxidation chemical reactions can occur when a fuel or a hydrocarbon is mixed with sub-stoichiometric amounts of oxygen in a high temperature reactor to produce a gaseous product and byproducts. For example, a carbonaceous feedstock 26 may be introduced to the reaction chamber 20 with oxygen 28 to produce an untreated syngas 30 and a molten slag 32. The carbonaceous feedstock 26 may include materials such as biofuels or fossil fuels, and may be in the form of a solid, a liquid, a gas, a slurry, or any combination thereof. The oxygen 28 introduced to the reaction chamber 20 may be replaced with air or oxygen-enriched air. In certain embodiments, an optional slag additive 34 may also be added to the reaction chamber 20. The slag additive 34 may be used to modify the viscosity of the molten slag 32 inside the reaction chamber 20 to improve slag flow characteristics and to ensure reliable movement of molten slag from the reaction chamber 20 into the quench chamber 22. In yet other embodiments, an optional moderator 36, such as water or steam, may also be introduced into the reaction chamber 20. The chemical reactions within the reaction chamber 20 may be accomplished by subjecting the carbonaceous feedstock 26 to steam and oxygen at elevated pressures (e.g., from approximately 2,000 to 10,000 kPa, or 3,000 to 8,500 kPa; from approximately 290 to 1,450 psi, or 435 to 1,233 psi) and temperatures (e.g., approximately 1,100 degrees C. to 1,500 degrees C., or 1,200 degrees C. to 1,450 degrees C.; from approximately 2,012 degrees F. to 2,732 degrees F., or 2,192 degrees F. to 2,642 degrees F.), depending on the type of gasifier 12 utilized. Under these conditions, and depending upon the composition of the ash in the carbonaceous feedstock 26, the ash may be in the molten state, which is referred to as molten ash, or molten slag 32.

The quench chamber 22 of the gasifier 12 may receive the untreated syngas 30 and the molten slag 32 as it leaves the reaction chamber 20 through the bottom end 38 (or throat) of the protective barrier 24. The untreated syngas 30 and the molten slag 32 enter the quench chamber 22 at a high pressure (e.g., upstream pressure) and a high temperature. In general, the quench chamber 22 may be used to reduce the temperature of the untreated syngas 30, to disengage the molten slag 32 from the untreated syngas 30, and to quench the molten slag 32. In certain embodiments, a quench ring 40, located at the bottom end 38 of the protective bather 24, is configured to provide a quench liquid 42 (e.g., water) from a quench liquid system 43 to the quench chamber 22. The quench liquid may be received by a quench inlet 44 and into the quench ring 40 through a line 46. In general, the quench liquid 42 may flow through the quench ring 40 and down the inner surface of a dip tube 47 into a quench chamber sump 48. Quench liquid 42 may return via quench liquid blowdown line 49 to the quench liquid system 43 for cooling and cleaning prior to returning to the quench ring 40. Likewise, the untreated syngas 30 and the molten slag 32 may also flow through the bottom end 38 of the protective bather 24, and through the dip tube 47 into the quench chamber sump 48. As the untreated syngas 30 passes through the pool of quench liquid 42 in the quench chamber sump 48, the molten slag 32 is solidified and disengaged from the syngas, the syngas is cooled and quenched, and the syngas subsequently exits the quench chamber 22 through a syngas outlet 50, as illustrated by arrow 52. Quenched syngas 54 exits through the syngas outlet 50 for further processing in a gas treatment system 56, where it may be further processed to remove acid gases, particulates, etc., to form a treated syngas. Solidified slag 58 may accumulate at the bottom of the quench chamber sump 48 and may be continuously removed from the gasifier 12 as a slag slurry 14. In certain embodiments, a portion of the quench liquid 42 may also be continuously removed via quench liquid blowdown line 49 from the quench chamber sump 48 for treatment in quench liquid system 43. For example, fine particulates, soot, fine slag, and other matter may be removed from the quench liquid 42 in the quench liquid system 43, and the treated quench liquid 42 may be returned to the quench chamber sump 48 through the quench inlet 44.

The slag slurry 14 may have various compositions of solids suspended in the quench liquid 42, including, but not limited to, char (i.e. partially reacted fuel), solidified ash particles of various sizes, and/or portions of the reaction chamber protective barrier 24. The slag slurry 14 being discharged from the gasifier 12 may have a high pressure (e.g., upstream pressure) and a high temperature. For example, the pressure of the slag slurry 14 may be between approximately 1000 to 10,000 kPag (e.g., 145 to 1,450 psig), 2,000 to 9,000 kPag (e.g., 290 to 1,305 psig), or 3,000 to 8,000 kPag (e.g., 435 to 1,160 psig), and the temperature of the slag slurry may be between approximately 150 to 350 degrees C. (e.g., 300 to 660 degrees F.), 200 to 300 degrees C. (e.g., 390 to 570 degrees F.), or 225 to 275 degrees C. (e.g., 435 to 525 degrees F.). In some embodiments, a cooling system 59 coupled to or integrally formed with the gasifier 12 may cool the slag 58 and slag slurry 14 before the slag slurry 14 exits the gasifier 12. The cooling system 59 may dispense (e.g., inject) a cooling fluid 61 (e.g., water) into the slag slurry 14 at a downstream end portion of the gasifier 12 to reduce the temperature of the slag slurry 14. Additionally, or in the alternative, a heat exchanger 72 (e.g., cooler) may reduce the temperature of the slag slurry 14 before the slag slurry 14 is fed through the depressurization system 16 to reduce or prevent flashing (i.e., vaporization) of the slag slurry 14 as it moves through the depressurization system 16. The heat exchanger 72 may allow for cooling of the slag slurry 14 without using additional quench liquid 42, such as water, which may involve additional processing (e.g., dewatering) of the slag slurry 14 to remove. In some embodiments, cooling the slag slurry 14 without the use of additional water may simplify downstream processing of the slag slurry 14, e.g., by reducing the amount of water to be removed before disposal of the slag slurry 14. Furthermore, as the slag slurry 14 moves through the heat exchanger 72, the pressure of the slag slurry 14 may drop, simplifying final processing and/or disposal of the slag slurry 14.

In certain embodiments, the controller 18 may receive signals from various sensors disposed throughout the continuous slag removal system 10. For example, sensors may provide information regarding characteristics of the slag slurry 14, operating conditions within the continuous slag removal system 10, the flow rate of the slag slurry 14, temperatures of the slag slurry 14 at various sites, pressures of the slag slurry 14 at various sites, and so forth. For example, a flow sensor "$F_1$" 60 may provide information regarding the flow rate of the slag slurry 14 exiting from the gasifier 12. A first pressure sensor "$P_1$" 62 may provide information on the first pressure (e.g., upstream pressure) of the slag slurry 14 exiting from the gasifier 12. The first pressure may be approximately equal to the pressure of the gasifier 12. In some embodiments, the controller 18 may receive additional sensor information about the slag slurry 14 as it exits the gasifier 12, such as, but not limited to, viscosity, temperature, particle size, and so forth. Furthermore, the controller 18 may adjust operational conditions of the continuous slag removal system 10 in response to received sensor information, as described in detail below.

In some embodiments, one or more slag crushers 64 coupled to a slag crusher driver 66 (e.g., a hydraulic motor, an electric motor, or other source of power) may optionally receive the slag slurry 14 before it is fed through the depressurization system 16. The slag crusher 64 may crush particles within the slag slurry 14 to attain a desired maximum particle size (e.g., top size) of particles in the slag slurry 14. The slag crusher 64 may reduce the size of particles (e.g., relatively large chunks of solidified slag 58 and/or portions of the reaction chamber protective barrier 24) greater than the top size. The slag crusher 64 may include one or more stages. Establishing an appropriate top size may be useful for enabling the slag slurry 14 to flow without obstructing certain passages, and for the operation of the depressurization system 16. In certain embodiments, the slag crusher 64 may reduce the particle size such that the top particle size is less than approximately 25 mm (1.0 inch), 19 mm (0.75 inch), or 13 mm (0.5 inch). In certain embodiments, a single slag crusher 64 may be sufficient to establish this top size, and in other embodiments, two or more slag crushers 64 may function together (e.g., in series) to establish this top particle size. For example, a first slag crusher may provide a coarse crushing of the slag slurry 14 while a second slag crusher may provide a finer crushing of the slag slurry 14. In one embodiment, the controller 18 may control the slag crusher 64 by controlling the slag crusher driver 66 (e.g., motor). The controller 18 may adjust the slag crusher driver 66 (e.g., motor) based on information received from the sensors.

In some embodiments, the controller 18 may receive information about the temperature of the slag slurry 14 from the temperature sensors "T" 74, which are located at various sites of the slag removal system 10. For example, the temperature sensors "T" 74 may be located before the slag slurry 14 exits the gasifier 12, before the slag slurry 14 enters the heat exchanger 72, coupled to the heat exchanger 72, or located after the slag slurry 14 leaves the heat exchanger 72. In response to the information received by the temperature sensors "T" 74, the controller 18 may control the cooling provided by the cooling system 59 and/or by the heat exchanger 72. For example, the controller 18 may adjust a control valve that controls the flow rate of the cooling fluid 61 to the cooling system 59 and/or the flow rate of a coolant through the heat exchanger 72. In some embodiments, in response to the information received by the temperature sensors "T" 74, the controller 18 may adjust a flow control valve 76 to add cold water 78 directly to the slag slurry 14. The cold water 78 may further cool the slag slurry 14 before the slag slurry 14 is fed into the depressurization system 16. The cold water 78 may be removed in the additional processing of the slag slurry 14 by a downstream slag processing system 94. The addition of the cold water 78 may be omitted. In certain embodiments, the temperature of the slag slurry 14 downstream of the heat exchanger 72 or the addition of the cold water 78 may be between approximately 10 to 150 degrees C. (e.g., approximately 50 to 302 degrees F.), 20 to 125 degrees C. (e.g., 68 to 257 degrees F.), or 30 to 100 degrees C. (e.g., 86 to 212 degrees F.).

In certain embodiments, the slag slurry 14 may be fed into the depressurization system 16. The depressurization system 16 has at least one reverse-acting pump 80 that receives the slag slurry 14 through an outlet 82, and discharges the slag slurry 14 through an inlet 84. Conventionally, a pump receives a fluid at the inlet at a relatively low pressure, and discharges the fluid from the outlet at a relatively high pressure. In other words, the reverse-acting pump 80 is configured to convey the slag slurry 14 in an opposite direction through the pump relative to a conventional pump. A motor 86 drives the reverse-acting pump 80 via a shaft 88. As discussed in detail below, the reverse-acting pump 80 is driven against the flow of the slag slurry 14 from the gasifier 12. The motor 86 drives the reverse-acting pump 80 to move at least a portion of the slag slurry 14 at an inlet pressure (e.g., atmospheric pressure) from the inlet 84 to the outlet 82 at a discharge pressure. The portion of the slag slurry 14 driven to the outlet at the discharge pressure may not flow upstream beyond the outlet 82, but rather recirculates to the inlet 84 when the upstream pressure (e.g., pressure at "$P_1$" 62) at the outlet 82 is greater than or equal to the discharge pressure generated by the pump at the speed at which it is rotating. The discharge pressure and the difference between the inlet pressure and the discharge pressure may be based at least in part on a speed of the reverse-acting pump 80. When the upstream pressure of the slag slurry 14 from the gasifier 12 (e.g., as sensed by pressure sensor "$P_1$" 62) is greater than the discharge pressure generated by the pump at the speed at which it is rotating, the reverse-acting pump 80 enables the slag slurry 14 to continuously flow from the outlet 82 to the inlet 84 while depressurizing the slag slurry 14 as discussed below. That is, the upstream pressure of the slag slurry 14 decreases from the upstream pressure sensed by the pressure sensor "$P_1$" 62 to the inlet pressure at the inlet 84 while flowing through the reverse-acting pump 80.

In some embodiments, a pressure sensor "$P_2$" 90 may sense a downstream pressure of the slag slurry 14 downstream of the at least one reverse-acting pump 80. The pressure drop of the slag slurry 14 across the reverse-acting pump 80 may be between approximately 100 to 10,000 kPa, 2,000 to 9,000 kPa, or 3,000 to 8,000 kPa (e.g., approximately 14.5 to 1,450 psi, 290 to 1,305 psi, or 435 to 1,160 psi). The downstream pressure of the slag slurry 14, as indicated by the second pressure sensor "$P_2$" 90, may be between approximately atmospheric pressure (0 kPa) to 690 kPa, 69 to 520 kPa, or 138 to 345 kPa (e.g., approximately 0 to 100 psi, 10 to 75 psi, or 20 to 50 psi), all expressed in gauge pressure. In certain embodiments, the second (e.g., downstream) pressure at the inlet 84 is approximately equal to atmospheric pressure. Additionally, or in the alternative, a flow sensor "$F_2$" 92 may sense the flow rate of the slag slurry 14 between the reverse-acting pump 80 and the downstream slag processing system 94. The downstream slag processing system 94 may dewater the slag slurry 14 and/or dispose of the slag slurry 14.

The controller 18 may control the flow of the slag slurry 14 through the reverse-acting pump 80 via control of the motor 86. The reverse-acting pump 80 is a variable-speed pump, thereby enabling the motor 86 to control the speed of the reverse-acting pump 80. Through controlling the speed of the reverse-acting pump 80, the controller 18 may control the discharge pressure at the outlet 82, thereby controlling the rate at which slag slurry 14 flows through the reverse-acting pump 80 from higher pressure outlet 82 to lower pressure inlet 84.

As discussed herein, the terms upstream and downstream refer to directions relative to the flow of a fluid (e.g., slag slurry 14) through the continuous slag removal system 10. Generally, the arrows of FIG. 1 illustrating the slag slurry 14 flow extend in the downstream direction from the gasifier 12 to the downstream slag processing system 94. Accordingly, the gasifier 12 is arranged upstream of the one or more slag crushers 64 and the depressurization system 16. The upstream pressure at the outlet 82 is the pressure of a fluid (e.g., slag slurry 14) immediately upstream of the reverse-acting pump 80, and the downstream pressure at the inlet 84 is the pressure of the fluid (e.g., slag slurry 14) immediately downstream of the reverse-acting pump 80. That is, the slag slurry 14 flows through the reverse-acting pump 80 from the outlet 82 at the relatively high upstream pressure to the inlet 84 at the relatively low downstream pressure. Accordingly, the slag slurry 14 backflows (e.g., from high pressure outlet to low pressure inlet) through the reverse-acting pump relative to the conventional direction (e.g., from low pressure inlet to high pressure outlet) of flow through a pump. Thus, as discussed herein, the terms upstream pressure and downstream pressure are relative to the installation orientation of the reverse-acting pump 80 such that the outlet 82 receives the fluid (e.g., slag slurry 14) at the upstream pressure and the inlet 84 discharges the fluid (e.g., slag slurry 14) at the downstream pressure as the fluid (e.g., slag slurry 14) flows downstream (i.e. backflows) through the reverse-acting pump 80 from a high pressure system (e.g., gasifier 12) to a low pressure system (e.g., downstream slag processing system 94).

Figure 2:
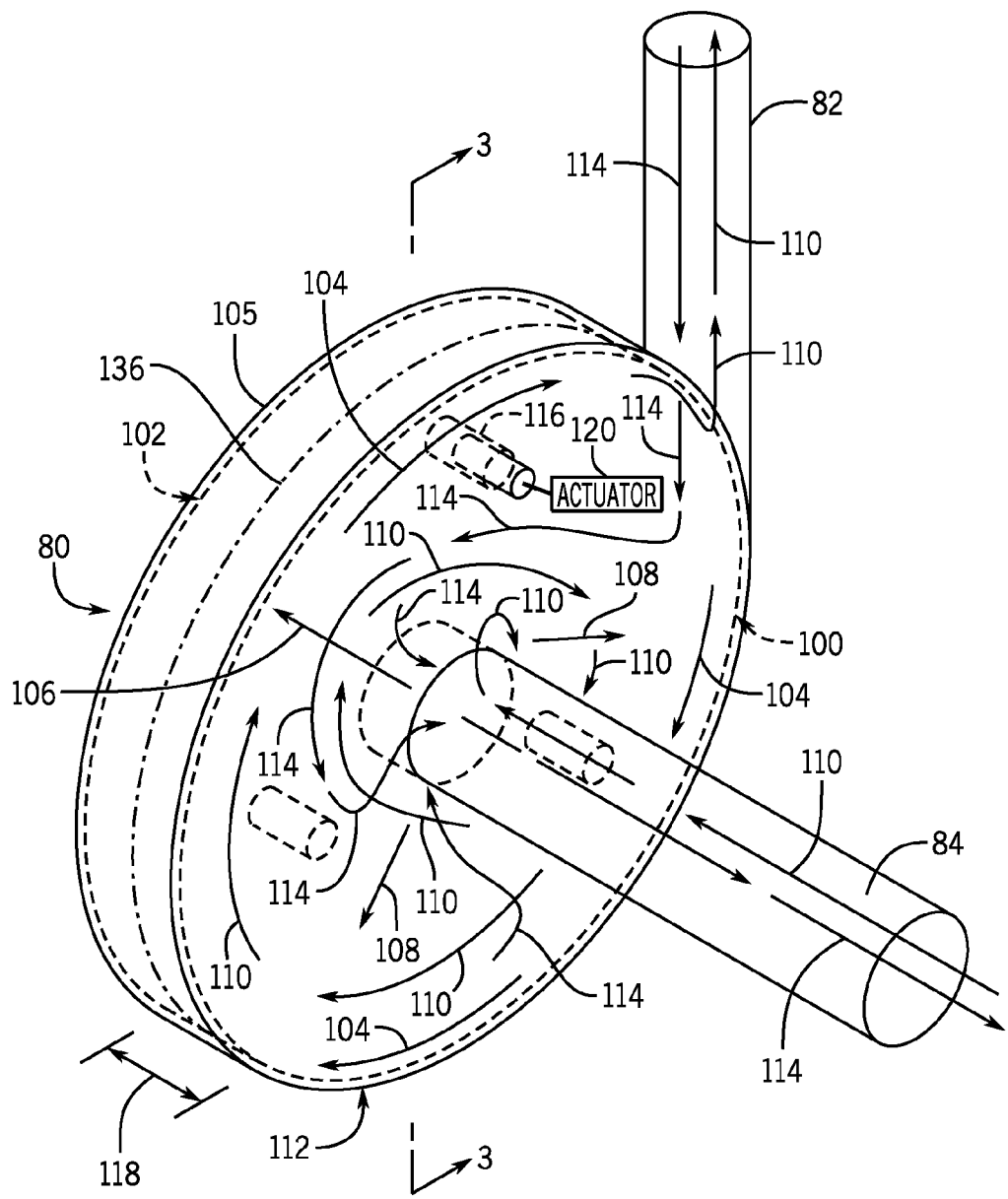
FIG. 2 is a perspective view of an embodiment of a reverse-acting pump of the depressurization system of FIG. 1.

FIG. 2 illustrates a perspective view of an embodiment of the reverse-acting pump 80 of FIG. 1. Opposing discs 100, 102 of the reverse-acting pump 80 rotate in a tangential direction 104 within a housing 105, drawing at least a portion of a fluid (e.g., slag slurry 14) from the inlet 84 to the outlet 82. As illustrated in FIG. 2, polar coordinates are utilized to describe relative directions of the reverse-acting pump 80 relative to an axis 106 of the inlet 84. For example, the inlet 84 is substantially parallel (e.g., aligned) with the longitudinal axis 106 relative to the reverse-acting pump 80. The outlet 82 may be tangentially aligned substantially opposite to the clockwise tangential direction 104 at a perimeter 112 of the housing 105. The opposing discs 100, 102 rotate in the clockwise tangential direction 104 about the longitudinal axis 106, driving the fluid (e.g., slag slurry 14) in both the radial outward direction 108 and the tangential clockwise direction 104. As may be appreciated, frictional forces from the opposing discs 100, 102 impart both a rotational clockwise (e.g., along arrows 104) and a radial outwards (e.g., along arrows 108) motion on fluid layers adjacent to the discs 100, 102. The viscous forces within the fluid transmit the rotational clockwise and radial outwards motion to adjacent layers of fluid that lie progressively further away from the discs 100, 102 and progressively closer to a centerline 136 between the two discs 100, 102. When the rotational speed of the discs 100, 102 is relatively high and/or the upstream pressure of the system (e.g., gasifier 12) connected to the outlet 82 is less than the discharge pressure of the reverse-acting pump 80 at the rotational speed, then the reverse-acting pump 80 may drive the fluid through the reverse-acting pump 80 as shown by the arrows 110. The arrows 110 show the direction of fluid flow if the reverse-acting pump 80 is installed and operated as a conventional pump to drive the fluid flow from the inlet 84 to the outlet 82. When the rotational speed of the discs 100, 102 is relatively low and/or the upstream pressure at the outlet 82 of the reverse-acting pump 80 is greater than the discharge pressure of the reverse-acting pump 80 at the rotational speed, then the fluid will backflow through the reverse-acting pump 80 in a direction 114 that is opposite from the conventional direction 110 (e.g., from the outlet 82 to the inlet 84). As discussed in detail below, when the upstream pressure at the outlet 82 of the reverse-acting pump 80 is approximately equal to the discharge pressure, the fluid recirculates within the reverse-acting pump 80. When the upstream pressure at the outlet 82 of the reverse-acting pump 80 is greater than the discharge pressure, then the net flow of fluid through the reverse-acting pump 80 flows from the outlet 82 to the inlet 84. At least a portion of the fluid recirculates within the reverse-acting pump 80 and the remainder of the fluid backflows through the reverse-acting pump 80, as shown by arrows 114 from the outlet 82 to the inlet 84.

The opposing discs 100, 102 rotate about the longitudinal axis 106 at approximately the same rate. The rotational speed of the opposing discs 100, 102 affects the discharge pressure at the outlet 82. In some embodiments, the discharge pressure may be greater than approximately 250, 500, 1000, 2000, 3000, or 4000 kPa or more. The reverse-acting pump 80 may include, but is not limited to, a disc pump from Discflo Corporation of Santee, Calif. One or more spacers 116 separate the opposing discs 100, 102 by a distance 118. The one or more spacers 116 are configured not to significantly affect the fluid (e.g., slurry), such as by driving or impelling the fluid through the disc pump 80. That is, the fluid (e.g., slurry) may substantially flow around the one or more spacers 116. In some embodiments, the spacers 116 may be adjusted along the longitudinal axis 106 by one or more actuators 120 to control the distance 118. For example, the one or more spacers 116 may be telescoping spacers. The one or more actuators 120 may be coupled to the discs 100, 102 and/or directly to the one or more spacers 116. The one or more actuators 120 may include, but are not limited to, hydraulic actuators, pneumatic actuators, electric motors, or any combination thereof. Decreasing the distance 118 while maintaining the rotational speed of the opposing discs 100, 102 may increase the discharge pressure, whereas increasing the distance 118 while maintaining the rotational speed may decrease the discharge pressure.

Figure 3:
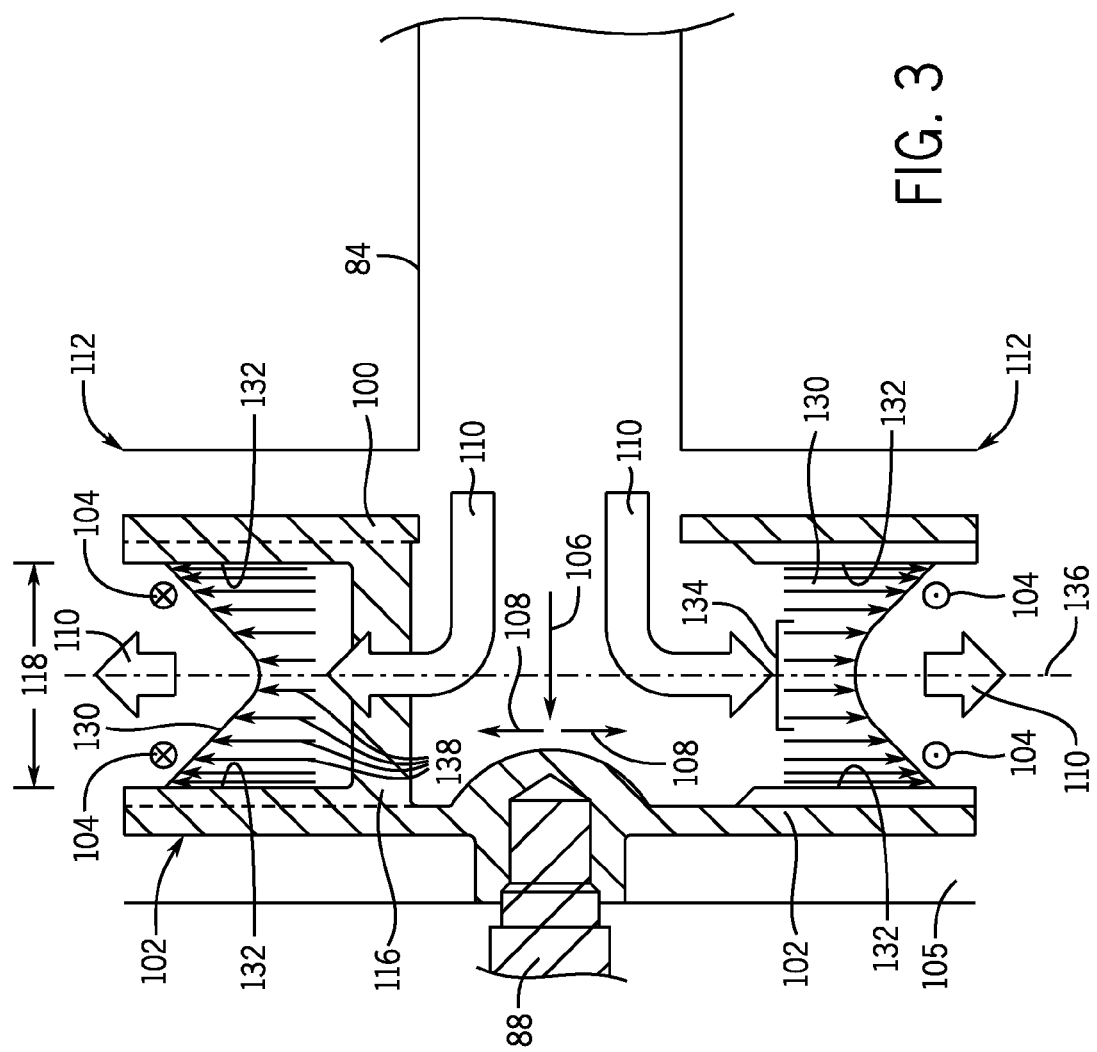
FIG. 3 is a cross-sectional view of an embodiment of the rotating discs of a reverse-acting pump of FIG. 2, taken along line 3-3.

FIG. 3 illustrates a cross-sectional view of an embodiment of the reverse-acting pump 80 of FIG. 2, taken along line 3-3. The illustrated cross-sectional view in FIG. 3 depicts an embodiment of the reverse-acting pump 80 in operation when the discharge pressure generated by the rotation of the discs 100, 102 is greater than the upstream pressure at the outlet 82. At least one of the opposing discs (e.g., disc 102) is directly coupled to the shaft 88, which drives the disc 102 in the tangential direction 104. The rotational motion of the shaft 88 and the directly coupled disc 102 is transmitted to the opposing disc 100 by two or more spacers 116, only one of which is shown in FIG. 3. The rotating discs 100, 102 exert forces on the fluid within the reverse-acting pump 80. The radial velocity profile 130 of the fluid within the reverse-acting pump 80 illustrated in FIG. 3 is based on the existence of a no-slip condition between the fluid (e.g., slag slurry) and the disc surfaces 132 when the discharge pressure generated by the rotation of the discs 100, 102 is greater than the upstream pressure at the outlet 82. The no-slip condition means that fluid interfacing with the disc surfaces 132 adheres to and/or does not move (e.g., no velocity) relative to the disc surface 132, whereas the fluid in a middle region 134 between the disc surfaces 132 may move with lower velocity that decreases towards a centerline 136 between the two discs 100, 102 of the reverse-acting pump 80. Viscous drag transfers momentum (i.e., velocity) from one fluid layer to another fluid layer between the discs 100, 102. However, viscous drag inefficiencies cause the fluid layers near the centerline 136 (e.g., middle region 134) to have a lower velocity than the fluid layers adjacent the surfaces 132 of the discs 100, 102. When the discharge pressure generated by the rotation of the discs 100, 102 is greater than the upstream pressure at the outlet 82, the fluid flows radially outward, as shown by arrows 110, from the inlet 84 towards the outlet 82 at the perimeter 112. Accordingly, each of the vectors 138 of the radial velocity profile 130 also extends outward towards the perimeter 112, indicating the net flow of the fluid.

While FIG. 3 illustrates flows along the longitudinal axis 106 and the radial axis 108, it may be appreciated that the fluid (e.g., slag slurry 14) also rotates about the longitudinal axis 106 in the clockwise tangential direction 104 as the discs 100, 102 rotate about the shaft 88. In some embodiments, the controller 18 may be configured to reduce operation of the reverse-acting pump 80 to direct any fluid upstream (e.g., flow in the normal direction of a conventional pump), as shown by arrows 110. In some embodiments, the controller 18 may control the reverse-acting pump 80 or motor 86 to reduce such a net fluid flow from the inlet 84 to the outlet 82. For example, the controller 18 may slow the speed of the reverse-acting pump 80 to reduce the upstream flow of the fluid from the inlet 84 to the outlet 82, such as a flow of slag slurry 14 into the gasifier 12.

Figure 4:
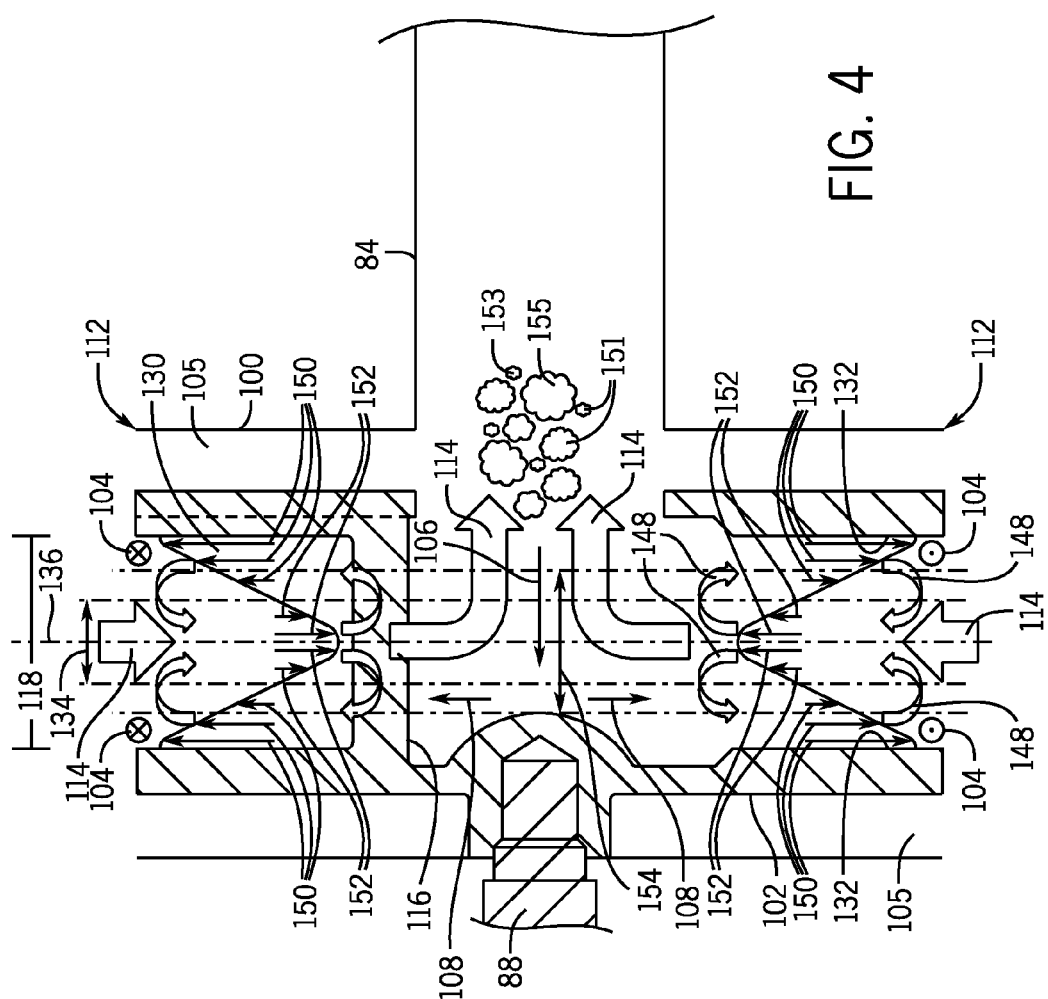
FIG. 4 is a cross-sectional view of an embodiment of the rotating discs of a reverse-acting pump of FIG. 2, taken along line 3-3.

FIG. 4 illustrates a cross-sectional view of an embodiment of the reverse-acting pump 80 of FIG. 2, taken along line 3-3. The illustrated cross-sectional view in FIG. 4 depicts an embodiment of the reverse-acting pump 80 in operation when the discharge pressure generated by the rotation of the discs 100, 102 is less than the upstream pressure at the outlet 82. The shaft 88 drives the opposing discs 100, 102 in the clockwise tangential direction 104. Under some operating conditions, the fluid (e.g., slag slurry 14) between the discs 100, 102 of the reverse-acting pump 80 may flow in a dual recirculation pattern oriented in the radial direction, as shown by arrows 148. For example, the fluid may recirculate when the discharge pressure generated by the rotation of the discs 100, 102 is approximately equal to the upstream pressure at the outlet 82 (e.g., the difference between the upstream pressure and the discharge pressure is approximately zero), the outlet 82 is closed off and/or the inlet 84 is closed off, or any combination thereof. In the dual radial recirculation pattern of the fluid (e.g., slag slurry 14), the fluid near surfaces 132 of the discs 100, 102 flows radially outward toward the perimeter 112, and the fluid near the middle region 134 flows radially inward toward the longitudinal axis 106.

When the upstream pressure at the outlet 82 is greater than the discharge pressure generated by the rotation of the discs 100, 102, the net flow through the reverse-acting pump 80 is from the outlet 82 to the inlet 84, as shown by arrows 114. The radial velocity profile 130 illustrated in FIG. 4 is based on the existence of a no-slip condition between the fluid (e.g., slag slurry) and the disc surfaces 132 when the discharge pressure generated by the rotation of the discs 100, 102 is less than the upstream pressure at the outlet 82. The interaction (e.g., friction, adhesion) between the fluid (e.g., slag slurry 14) and the disc surfaces 132 drives the fluid adjacent the discs 100, 102 radially outward toward the perimeter 112, whereas the greater upstream pressure relative to the discharge pressure generated by the rotation of the discs 100, 102 drives the fluid near the middle region 134 radially inward toward the longitudinal axis 106. For example, velocity vectors 150 for the fluid near the discs 100, 102 illustrate the radially outward flow driven by the discs 100, 102, and the velocity vectors 152 for the fluid in the middle region 134 illustrate the radially inward flow driven by the pressure difference at the outlet 82. When the upstream pressure is greater than the discharge pressure generated by the rotation of the discs 100, 102, the fluid (e.g., slag slurry 14) within the middle region 134 flows downstream, as illustrated by arrows 114.

As may be appreciated, the radial velocity profile 130 (e.g., velocity vectors 150 and 152) may vary based at least in part on the rotational speed of the opposing discs 100, 102. The rotational speed of the discs 100, 102 affects the magnitude of the backflow 114 through the reverse-acting pump 80. Increasing the rotational speed of the discs 100, 102 may increase the magnitude of the velocity vectors 150, decrease the width of the middle region 134, and decrease the magnitude of the velocity vectors 152, thereby increasing the discharge pressure generated at the outlet 82. Likewise, decreasing the rotational speed of the discs 100, 102, may decrease the magnitude of the velocity vectors 150, increase the width of the middle region 134, and increase the magnitude of the velocity vectors 152, thereby decreasing the discharge pressure generated at the outlet 82. The rate of backflow 114 through the reverse-acting pump 80 is based at least in part on a difference between the upstream pressure at the outlet 82 and the discharge pressure generated by the reverse-acting pump 80. The rate of the backflow 114 through the reverse-acting pump 80 increases as the difference between the upstream pressure and the discharge pressure generated at the outlet 82 by the rotating discs 100, 102 increases. As may be appreciated, the relationship between the rate of the downstream backflow 114 and the difference between the upstream pressure and the developed discharge pressure may be a proportional relationship, an exponential relationship, a logarithmic relationship, or any combination thereof. Accordingly, increasing the rotational speed of the discs 100, 102 may increase the discharge pressure generated at the outlet 82 and decrease the difference between the upstream pressure and the discharge pressure, thereby reducing the rate of backflow 114 through the reverse-acting pump 80. Likewise, decreasing the rotational speed of the discs 100, 102 may decrease the discharge pressure generated at the outlet 82 and increase the difference between the upstream pressure and the discharge pressure, thereby increasing the rate of backflow 114 through the reverse-acting pump 80.

Particles 151 (e.g., slag 58) within the fluid (e.g., slag slurry 14) may flow from the outlet 82 to the inlet 84 with the backflow 114. As may be appreciated, slag particles 151 of various sizes may encounter the recirculating flow pattern 148 between the discs 100, 102 as they move with the backflow 114 between the discs 100, 102. The majority of particles 151 may generally be confined to the middle region 134 between the discs 100, 102 where the radially inward velocity vectors 152 and the positive pressure difference between the upstream pressure and the pressure generated by the rotating discs 100, 102 at the pump outlet 82 drives the particles 151 backwards through the reverse-acting pump 80 from outlet 82 to inlet 84. In some situations, some of the slag particles 151 may drift outwards, away from the centerline 136, and may encounter the region outside of the middle region 134 and may become entrained in that portion of the flow profile defined by the radially outward velocity vectors 150 near the surfaces 132 of the opposing discs 100, 102. In such situations, the particles 151 will move radially outwards from the inlet 84 to the outlet 82, thereby moving in the opposite direction from the net backwards flow 114 from the outlet 82 to the inlet 84 of the pump. Smaller particles 153 may be more likely than larger particles 155 to be entrained in this recirculating flow pattern 148. Nevertheless, because the upstream pressure is greater than the pressure generated at the pump outlet 82 and because there is a net backflow 114 of slag slurry 14 from the pump outlet 82 to the pump inlet 84, these smaller particles 153 are not likely to accumulate in the reverse-acting pump 80. That is, the net backflow 114 of the slag slurry 14 may eject the smaller particles 153 from the recirculation pattern 148 such that the smaller particles 153 exit the reverse-acting pump 80 via the pump inlet 84 as part of the backflow stream 114.

Relatively large particles 155 that enter the reverse-acting pump 80 through the outlet 82 may backflow through the reverse-acting pump 80 even if the respective particle diameter exceeds the width of the middle region 134 where the velocity vectors 152 point radially inward. Despite the fact that a portion of a large particle 155 may encounter the region near the disc surfaces 132 outside of the middle region 134, and may thereby encounter a portion of the velocity profile 130 in which the velocity vectors 150 point radially outward, the momentum of the backflow 114 stream is sufficient to direct the large particle 155 from the pump outlet 82 to the pump inlet 84. However, in some cases, the diameter of a large particle 155 may be large enough so that it encounters a substantial portion of the velocity profile 130 in which the velocity vectors 150 point radially outwards in addition to the middle region 134 of the flow profile 130 in which the velocity vectors 152 point radially inward. In such cases, the drag on the large particle 155 by the radially inward portion of the velocity vectors 152 of the flow profile 130 may approximately balance the drag on the large particle 155 by the radially outward portion 150 of the flow profile. In such cases, such large particles 155 may begin to accumulate within the reverse-acting pump 80. Thus, a central region 154 of the flow profile 130 may exist for which large particles 155 whose diameters fit within that central region 154 may backflow through the reverse-acting pump 80 (e.g., arrows 114), whereas large particles 155 with diameters greater than the width of the central region 154 may accumulate within the reverse-acting pump 80 until the rotational speed of the reverse-acting pump 80 decreases, thereby widening the central region 154. Thus, the width of the central region 154 that includes some of the radially outward flow (e.g., radial velocity vectors 150) may determine the maximum particle size that may flow from the outlet 82 to the inlet 84 of the reverse-acting pump 80. In some embodiments, particles 155 (e.g., slag 58) wider than the central region 154 may not flow through the reverse-acting pump 80. The central region 154 is wider than the middle region 134.

The controller 18 may control the one or more slag crushers 64 to reduce the particle size, such that the slag slurry 14 may flow through the reverse-acting pump 80. Additionally, or in the alternative, the controller 18 may longitudinally adjust the reverse-acting pump 80 along the longitudinal axis 106 to control the width of the central region 154. For example, the controller 18 may control the one or more spacers 116 to expand or contract to control the spacing 118 between the discs 100, 102. Through control of the spacing 118, the controller 18 may also control the widths of the middle region 134 and the central region 154, thereby enabling the controller 18 to control the size of particles 151 that flow through the reverse-acting pump 80. As discussed above, the spacing 118 may affect the discharge pressure at the outlet 82. The difference between the discharge pressure and the upstream pressure may affect the central region 154. For example, a large pressure difference may cause the central region 154 to widen to accommodate a greater backflow rate of the fluid (e.g., slag slurry 14). In some embodiments, the controller 18 may control the spacing 118 and the speed of the reverse-acting pump 80 to control the discharge pressure and the width of the central region 154, thereby controlling the flow of the fluid (e.g., slag slurry 14) from the outlet 82 to the inlet 84 of the reverse-acting pump 80.

Figure 5:
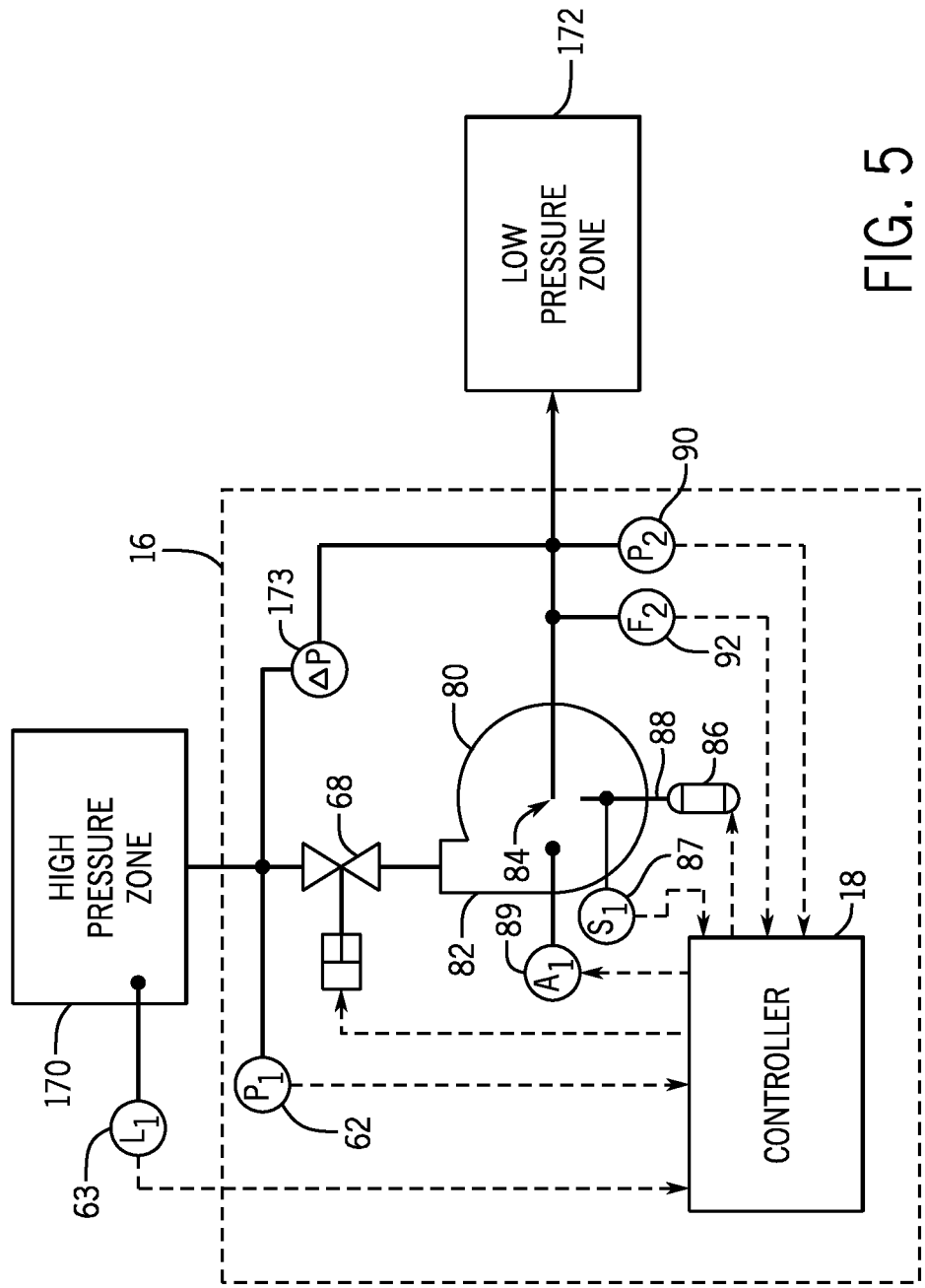
FIG. 5 is a schematic diagram of an embodiment of the depressurization system.

FIG. 5 is a schematic diagram of an embodiment of the depressurization system 16 arranged between a high pressure zone 170 (e.g., gasifier 12) and a low pressure zone 172 (e.g., downstream processing system 94). The high pressure zone 170 may include, but is not limited to a gasifier 12, a reactor, a tank, or any combination thereof. The low pressure zone 172 may include, but is not limited to, a downstream processing system 94, a reactor, a tank, or reservoir at low pressure relative to the high pressure zone 170 (e.g., atmospheric pressure, approximately 206 kPa gauge, 345 kPa gauge, or 483 kPa gauge (e.g., approximately 30 psig, 50 psig, or 70 psig) or more), or any combination thereof. As may be appreciated, the fluid may include, but is not limited to, the slag slurry 14, a carbonaceous slurry, a mineral slurry, or any combination thereof. The high pressure zone 170 supplies fluid (e.g., slag slurry 14) to the depressurization system at the upstream pressure, which may be sensed by the pressure sensor "$P_1$" 62. The reverse-acting pump 80 depressurizes the fluid from the upstream pressure at the outlet 82 to a downstream pressure at the inlet 84. The pressure sensor "$P_2$" 90 may sense the downstream pressure of the fluid from the inlet 84. Additionally, or in the alternative, a pressure differential sensor 173 with high leg at the location of pressure sensor "$P_1$" 62 and low leg at the location of pressure sensor "$P_2$" 90 may sense the pressure drop across the pump 80 directly. The speed of rotation of the reverse-acting pump 80 may be sensed by speed sensor "S1" 87 connected to the shaft 88 of the reverse-acting pump 80; and the speed of rotation of the reverse-acting pump 80 may be controlled by the controller 18 and the motor 86. The spacing between the discs 100, 102 may be controlled by controller 18 and disc spacing actuator "A1" 89. The pressure drop from the outlet 82 to the inlet 84 of the reverse-acting pump 80 may be based at least in part on the size of the reverse-acting pump 80, the speed of the reverse-acting pump 80, the spacing 118 between the discs 100, 102 of the reverse-acting pump 80, or the flow rate through the reverse-acting pump 80, or any combination thereof. In some embodiments, the pressure drop from the outlet 82 to the inlet 84 of the reverse-acting pump 80 may be less than approximately 5,000, 4,000, 3,000, 2,000, 1,000, 500, 200, 100, 50 kPa (e.g., less than approximately 725, 580, 435, 290, 145, 73, 29, 14.5, or 7.3 psi). The controller 18 may control the motor 86 and/or the disc spacing actuator "A1" 89 to adjust the pressure drop via control of the speed of the reverse-acting pump 80 and/or the spacing 118 between the discs 100, 102.

In some embodiments, the depressurization system 16 may have multiple reverse-acting pumps 80 coupled together in series to enable a desired pressure drop. For example, a first and a second reverse-acting pump may each depressurize a fluid flow by up to approximately 5,000 kPa (e.g., approximately 725 psi). Coupling the inlet 84 of the first reverse-acting pump to the outlet 82 of the second reverse-acting pump in series may enable the depressurization system 16 with the first and the second reverse-acting pumps to depressurize a fluid flow by up to approximately 10,000 kPa (e.g., approximately 1,450 psi). Embodiments with multiple reverse-acting pumps 80 may include one or more sensors (e.g., pressure sensors, flow sensors) between reverse-acting pumps 80 in addition to the sensors (e.g. pressure sensors, flow sensors) upstream of the first pump and the sensors (e.g. pressure sensors, flow sensors) downstream of the last pump.

The depressurization system 16 continuously conveys fluid from the high pressure zone 170 to the low pressure zone 172. The flow sensor "$F_2$" 92 may sense a flow rate from the reverse-acting pump 80 and provide feedback to the controller 18. Based at least in part on the feedback from the flow sensor "$F_2$" 92, the controller 18 may control the motor 86 and/or the disc spacing actuator 89 as described above to maintain a flow rate of the fluid (e.g., slag slurry 14) within a desired threshold range. Moreover, the controller 18 may monitor feedback from the flow sensor "$F_2$" 92 to identify any discrepancies between a desired output from the depressurization system 16 as controlled by the controller 18, and the sensed output from the depressurization system 16. For example, the controller 18 may identify blockages or accumulation of particles in the reverse-acting pump 80 from a decreasing flow rate of the fluid. Additionally, or in the alternative, the controller 18 may identify an unexpected stoppage of the reverse-acting pump 80 due to a change (e.g., increase) in the sensed flow rate and/or the sensed pressure and/or the sensed shaft speed. For example, the controller 18 may identify a rapid depressurization of the fluid from the high pressure zone 170 from a sudden increase in the sensed pressure at the pressure sensor "$P_2$" 90 and/or a sudden increase in the sensed flow rate at the flow sensor "$F_2$" 92. In the event of a decreasing flow rate, the controller 18 may respond by reducing the speed of the motor 86 in order to decrease the speed of the reverse-acting pump 80 and/or by controlling the disc spacing actuator "$A_1$" 89 in order to increase the spacing between discs. The controller may close the isolation valve 68 to allow for maintenance of the reverse-acting pump 80 and/or to stop depressurization in the event of a sudden stoppage of the reverse-acting pump 80 and a rapid depressurization of the fluid.

The depressurization system 16 may aid maintenance of a steady fluid level in the high pressure zone 170 (e.g., in the quench sump 48 of the gasifier quench chamber 22, as shown in FIG. 1), such as by continuously conveying a steady flow rate of fluid from high pressure zone 170 to low pressure zone 172. In some embodiments, the controller 18 may identify a blockage in the quench liquid blowdown line 49 in FIG. 1 from an increasing level in the quench sump 48 (i.e. the high pressure zone 170) sensed by level sensor 63 "L1" in FIG. 5. The controller 18 may respond to a sensed increase in quench sump level by increasing the flow of fluid through the reverse-acting pump 80 in order to compensate for the fluid which is not being removed through the quench liquid blowdown line 49 in FIG. 1. The controller 18 may decrease the speed of the motor 86 in order to increase the flow through the reverse-acting pump 80 and/or may adjust the disc spacing actuator "A1" 89 in order to increase the spacing between discs 100, 102, thereby increasing the flow through the reverse-acting pump 80.

Additionally, or in the alternative, the depressurization system 16 may aid maintenance of a steady pressure (e.g., $P_2$) at the pump inlet 84 and/or the inlet to the low pressure zone 172 (e.g., downstream slag processing system 94). The controller 18 may control the speed of the motor 86 and/or the spacing between the discs 100, 102 to control the pressure sensed by the second pressure sensor 90 and/or the pressure differential sensor 173. In some embodiments, the low pressure zone 172 may have a threshold pressure such that fluids (e.g., slag slurry 14) received at pressures greater than or approximately equal to the threshold pressure may flow through the low pressure zone 172 (e.g., downstream slag processing system 94). As may be appreciated, the controller 18 may control the pressure of the fluid received by the low pressure zone 172 to one or more desired pressures during startup, steady state operation, or during shutdown of the system 9. The one or more desired pressures may be predefined or received by the system 9, and may be based at least in part on the components of the low pressure zone 172.

Technical effects of the invention include enabling a reverse-acting pump to continuously depressurize a fluid. The reverse-acting pump receives the fluid (e.g., slag slurry) through the outlet at an upstream pressure from a high pressure zone, and discharges the fluid to a low pressure zone through the inlet at a downstream pressure less than the upstream pressure. The reverse-acting pump drives a portion of the fluid from the inlet to the outlet at a discharge pressure that is characteristic of the pump geometry and the speed of rotation of the discs, thereby generating an adjustable resistance to the flow of the fluid from the high pressure zone. The portion of the fluid driven to the outlet at the discharge pressure recirculates from the outlet back through the reverse-acting pump when the discharge pressure generated by the pump is less than or equal to the upstream pressure. The discharge pressure of the reverse-acting pump is controlled by varying the speed of rotation of the discs or by varying the spacing between discs in order to adjust the flow rate of the fluid from the outlet to the inlet. Increasing the speed of the reverse-acting pump increases the discharge pressure generated by the pump, and decreasing the speed of the reverse-acting pump decreases the discharge pressure generated by the pump. Additionally, the spacing between discs of the reverse-acting pump may be controlled to adjust both the flow rate of fluid as well as the maximum particle size that may flow through the reverse-acting pump from the outlet to the inlet.

Figure 6:
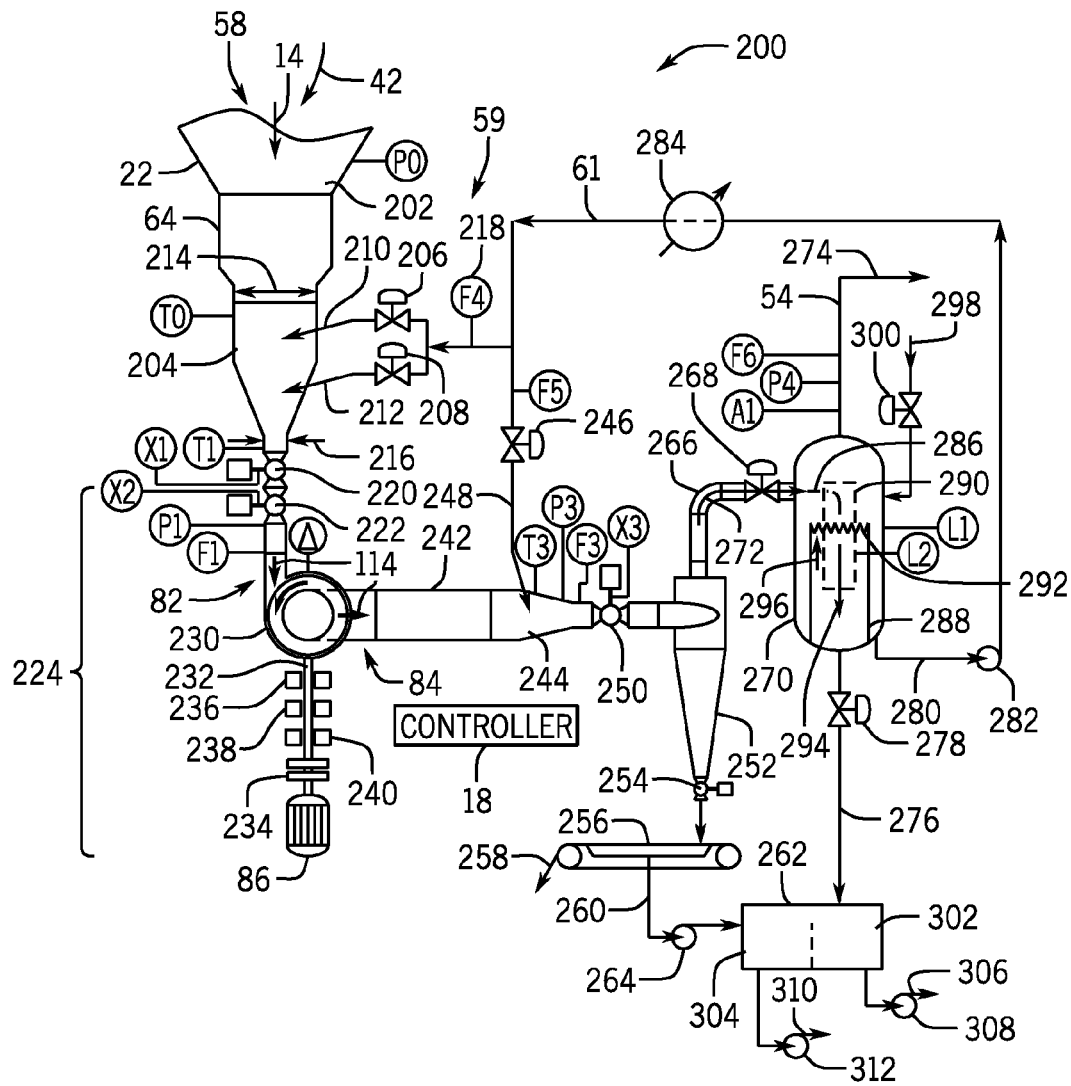
FIG. 6 is a schematic diagram of an embodiment of a continuous slag removal system with a depressurization system having one rotating parallel disc pump.

FIG. 6 illustrates an embodiment of a continuous slag letdown (CSL) system 200. Slag 58 and quench liquid 42 (e.g., water) enter the CSL system via a bottom exit nozzle 202 of the gasifier quench chamber 22. As described above, slag 58 is a byproduct of the gasification process and may include, but is not limited to small, friable glass-like solids that are typically ¼" or smaller in diameter, although occasionally larger particles may be produced. In some embodiments, the slag 58 may include brick portions from refractory lining (e.g., protective barrier 24) of the reaction chamber, which sits immediately above the quench chamber 22. These brick portions may become part of the slag slurry stream 14 entering the CSL system 200. Connected to the quench chamber 22 is a slag crusher 64 which reduces any oversize pieces of slag or brick portions to sizes which are readily flowable through downstream equipment. The maximum top size for solids downstream of the slag crusher 64 may be less than approximately 2.54 cm, 1.9 cm, or 1.27 cm (e.g., approximately 1 inch, 0.75 inch, or 0.5 inch), or smaller.

After passing through the slag crusher 64, the slag slurry 14 enters a first cooling funnel 204. A cooling fluid 61 (e.g., water) flow may be injected into the cooling funnel 204 at one or more levels and/or locations about the cooling funnel 204 from the cooling system 59. For example, flow control valves 206 and 208 may supply jets 210, 212 of cooling fluid (e.g., water) to the cooling funnel 204 at different levels. In some embodiments, a diameter 214 of the slag crusher outlet may be larger than an inlet diameter 216 of downstream equipment (e.g., let down turbine, reverse-acting pump). The cooling funnel 204 may funnel the slag slurry 14 from the larger diameter 214 of the slag crusher outlet into the smaller diameter 216 of the downstream equipment. Additionally, or in the alternative, the cooling funnel 204 provides a chamber for mixing the cooling water with the slag slurry 14 to produce a combined stream with reduced temperature. Reducing the temperature of the slag slurry 14 that is depressured through the CSL system 200 reduces or eliminates the likelihood for dissolved process gases to flash in the pressure letdown device and/or downstream equipment. While FIG. 6 illustrates two water jets 210, 212 at different levels, each of the levels may have 1, 2, 3, 4, 5, 6, 7, 8, 9, 10, or more water jets disposed around the periphery or extending into the cooling funnel 204. In some embodiments, one or more of the water jets 210, 212 may be angled downstream towards the outlet of the cooling funnel 204. Additionally, or in the alternative, one or more of the water jets 210, 212 may connect to the cooling funnel 204 in a tangential fashion. Orienting the water jets 210, 212 in such a downstream and tangential manner, a swirling, downwardly flowing current of cooling water may be induced to move through the cooling funnel 204, thereby enhancing mixing of the two streams (e.g., slag slurry 14 and cooling water), and assisting the flow of solids into the smaller diameter 216 of the downstream equipment. It should be appreciated that the quantity of levels of water jets, the quantity of water jets per level, or the orientation of each of the water jets, or any combination thereof, may vary among embodiments of the cooling funnel 204. Likewise, while FIG. 6 illustrates one flow meter $F_4$ (e.g., 218) coupled to the water control valves 206, 208, it should also be appreciated that individual flow meters may be associated with each flow control valve and that the flow rate of cooling fluid 61 to each level may differ.

After the slag slurry 14 and cooling water mix in the cooling funnel 204, the slag slurry 14 passes through two shutoff valves 220, 222. Each of the shutoff valves may include a full port ball valve, thereby enabling the shutoff valves 220, 222 to close rapidly to isolate a downstream portion 224 of the CSL system 200 from the quench chamber 22. The shutoff valve 222 may be configured as a backup to the shutoff valve 220.

After passing through shutoff valves 220, 222, the slag slurry 14 enters the continuous slag letdown device 230, which continuously reduces the pressure of the slag slurry 14 from the relatively high pressure $P_0$ of the quench chamber 22 to a pressure $P_3$ that is less than pressure $P_0$ yet sufficient to drive the slag slurry 14 through the rest of the CSL system 200 equipment downstream of the continuous slag letdown device 230. The continuous slag letdown device 230 may include, but is not limited to, the rotating parallel disc pump described above, available from Discflo Corporation of Santee, Calif. As described in detail below, the continuous slag letdown device 230 (e.g., the disc pump) may be operated in a "letdown turbine mode" and/or a "reverse-acting pump mode." A shaft 232 of the continuous slag letdown device 230 is connected via a clutch 234 to a variable speed motor 86. The rotating shaft also has a speed sensor 236, an eddy current (i.e. electromagnetic) brake 238 for slowing or stopping the rotation of the shaft 232 when the variable speed motor 86 is disconnected from the continuous slag letdown device 230 in letdown turbine mode, and a friction brake 240 as a backup for the eddy current brake 238.

It should be noted that utilizing the rotating parallel disc pump as a continuous pressure letdown device 230 utilizes the rotating parallel disc pump differently than conventional modes of operation. Conventionally, material flows from the inlet 84 to the outlet 82, opposite to the backflow 114 illustrated in FIGS. 2, 4, and 6. A diameter of the inlet 84 may be greater than a diameter of the outlet 82. However, when using the rotating parallel disc pump as a continuous pressure letdown device 230, the inlet 84 and outlet 82 are repurposed, with the outlet 82 configured to receive the slag slurry 14 from an upstream component (e.g., cooling funnel 204) and the inlet 84 configured to discharge the slag slurry 14 to a downstream component. Thus, a reduced temperature slag slurry 14 enters the outlet 82 (e.g., relatively small diameter outlet 82) of the continuous pressure letdown device 230, loses pressure as it moves through the continuous pressure letdown device 230, and exits at a reduced pressure from the inlet 84 (e.g., relatively large diameter inlet 84). In some embodiments, some of the dissolved gases in the water, such as $NH_3$, $H_2S$, $CO_2$, CO and $H_2$, may come out of solution inside the continuous pressure letdown device 230 without significantly affecting the operation of the continuous pressure letdown device 230 (e.g., rotating parallel disc pump).

In some embodiments, the depressured slag slurry 14 and some entrained gas bubbles pass through a conduit 242 (e.g., horizontal conduit) that connects the repurposed inlet 84 of the pressure letdown device 230 with a second cooling funnel 244. The second cooling funnel 244 may be connected via a flow control valve 246 to the same source of cooling fluid 61 for the first cooling funnel 204 or a different source of cooling fluid 61. In some embodiments, the second cooling funnel 244 may be utilized to further cool the slag slurry, thereby reducing the likelihood of dissolved gases to flash in downstream components. Additionally, or in the alternative, the second cooling funnel 244 may be utilized to assist the movement of the slag slurry 14 from a larger diameter inlet 84 of the continuous pressure letdown device 230 into a relatively smaller diameter inlet of the downstream equipment. As described above with the first cooling funnel 204, one or more cooling water jets 248 may be attached to the second cooling funnel 244 at an angle that is oriented in a downstream and/or tangential direction relative to the periphery of the second cooling funnel 244. While FIG. 6 illustrates only one cooling water jet 248 coupled to the second cooling funnel 244, one may appreciate that additional cooling water jets and/or additional levels of one or more cooling water jets may be coupled to the second cooling funnel 244 at various angles and/or orientations relative to the second cooling funnel 244.

After passing through the second cooling funnel 244, the slag slurry 14 may pass through backup shutoff valve 250 and enter a hydrocyclone 252, which provides bulk separation of the solids (e.g., slag 58) from the water. The hydrocyclone 252 may be configured to direct most of the solids and some of the water of the slag slurry 14 though a bottom isolation valve 254. From bottom isolation valve 254, the solids of the slag slurry 14 may be further processed on a vacuum belt filter 256, which produces a final dewatered solids stream 258 and a filtrate stream 260 (e.g., water) that is pumped to water sump 262 via pump 264. The majority of the water along with some entrained fine solids and gas bubbles exits the hydrocyclone 252 via an overhead line 266 and passes through backpressure control valve 268 into a flash tank 270 as an inlet stream 272.

The flash tank 270 may be configured to separate the inlet stream 272 into a flash gas stream 274 that exits the top of the flash tank 270, a fine solids containing water stream 276 that exits the bottom of the tank via control valve 278, and a clarified water stream 280 that may be recycled to cooling funnels 204 and 244 via a pump 282 and cooler 284. As shown in FIG. 6, some embodiments of the flash tank 270 may have various internal components to separate the various streams. For example, the flash tank 270 may have a downwardly curving inlet pipe 286, a larger cylindrical weir 288 that extends from the bottom of the flash tank 270 to the middle of the flash tank 270, and a smaller cylindrical inlet baffle 290 that is suspended in the middle of the flash tank 270. The larger cylindrical weir 288 may have a saw tooth edge 292 at the top, the smaller cylindrical inlet baffle 290 may have an upper edge that extends above the saw tooth weir 288 and the curving inlet pipe 286, and the smaller cylindrical inlet baffle 290 may have a lower edge that extends below the saw tooth edge 292 on the cylindrical weir 288. Water, fine solids and gas entering the flash tank 270 via the curved inlet pipe 286 are directed in a downward direction 294 along the centerline of the flash tank 270 into the middle of the inlet baffle 290 just above the water line, which sits about at the level of the saw tooth edge 292 on the cylindrical weir 288.

The gas portion (e.g., syngas 54) of the inlet stream 272 reverses direction and may collect in the top of the flash tank 270. The gas portion may leave the flash tank 270 as a flash gas stream 274 en route to a vacuum flash tank in a black water section of the gasification plant. The water 280 and fines solids 276 of the inlet stream 272 are directed down into the pool of water inside the baffle 290. As water is withdrawn from the flash tank via valve 278 and pump 282, and as the inlet stream 272 continues to enter via the inlet pipe 286, a constant flow of water in the downward direction 294 is generated within the bottom half of the baffle 290. When the fine solids reach the bottom edge of the baffle 290, they tend to continue in the downwards direction 294 by virtue of their momentum, whereas at least a portion of the water reverses direction and moves in an upward direction in the annular gap between the baffle 290 and the cylindrical weir 288. Thus, the fine solids tend to concentrate in the water that continues to move downwards 294 in the flash tank 270 and that passes, via control valve 278, into the water sump 262. In contrast, the clarified water 280 that moves upwards 296 between the baffle 290 and the cylindrical weir 288 tends to be relatively free of solids. That is, the clarified water 280 between the baffle 290 and the cylindrical weir 288 may contain only very fine solids. As the clarified water 280 continues to move upwards 296, it eventually reaches the saw tooth edge 292 of the cylindrical weir 288 and spills over into the annular space between the cylindrical weir 288 and the wall of the flash tank 270. The clarified water 280 in this outer annular space may provide a reservoir of water that supplies the suction of pump 282. Pump 282 circulates the water through cooler 284 to provide cooled cooling water to cooling funnels 204 and 244. Fresh makeup water 298 may be added to the flash tank via control valve 300 in order to provide an available supply of water for pump 282.

The water sump 262 has a first portion 302 (e.g., a "dirty side") illustrated in FIG. 6 on the right side of the water sump 262, and a second portion 304 (e.g., a "clean side") illustrated in FIG. 6 on the left side of the water sump 262. Water having fines (e.g., fine slag particles) from the bottom of the flash tank 270 enters the first portion 302 via control valve 278. The water having fines 306 may be pumped from the first portion 302 via the pump 308 to a black water system in the gasification plant for further processing. Filtrate water 310 from the vacuum belt filter 256 enters the second portion 304 via the pump 264. From the second portion 304, the filtrate water 310 may be pumped via a pump 312 to the grey water system in the gasification plant for reuse in the gasification plant. Pumps 308 and 312 may be controlled by level controllers (e.g., float valves) on the first and second portions 302, 304 of the water sump 262, respectively.

As shown in FIG. 6, the CSL system 200 may be fitted with a number of sensors, valves, and motor starters that are used to monitor and control the system. A computerized controller 18, as discussed above, may be used to receive data from the various flow rate, pressure, temperature, level, position, speed and composition sensors. The controller may also be used to send signals which activate the variable speed motor 86, the clutch 234, the brakes 238, 240, the vacuum belt filter unit 256, the pumps 264, 282, 308, 312, and the valves 220, 222, 250, 206, 208, 246, 268, 254, 278, 300 in order to achieve the desired control of the CSL system 200.

Figure 7:
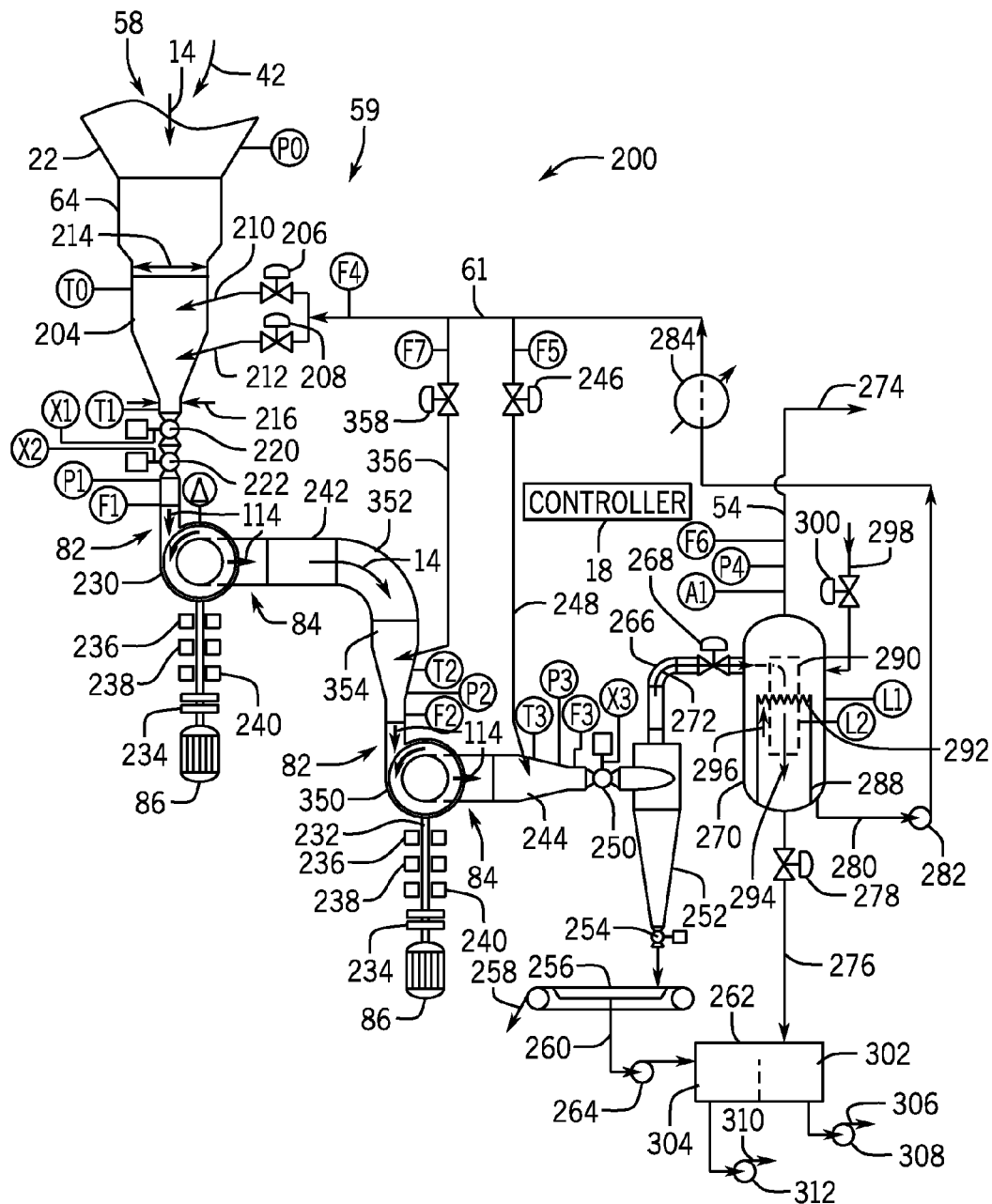
FIG. 7 is a schematic diagram of an embodiment of a continuous slag removal system with a depressurization system having two rotating parallel disc pumps.

For gasifiers operating at pressures on the order of 4136-4826 kPa (e.g., 600-700 psig), or less, a single continuous pressure letdown device 230 as shown in FIG. 6 may be sufficient for letting down the pressure of the slag slurry 14 from the gasifier quench chamber 22. Gasifiers with higher pressures may utilize a second pressure letdown device 350 in series with the first pressure letdown device 230 to generate a desired pressure drop. FIG. 7 illustrates an embodiment of the CSL system 200 that uses two rotating parallel disc pumps (e.g., 230 and 350) in series. In some embodiments of the CSL system 200 with pressure letdown devices in series, a bend 352 (e.g., approximately 90-degree bend) is inserted in the conduit 242 between the two pressure let down devices 230, 350. Additionally, or in the alternative, a third cooling funnel 354 may be added immediately upstream of the second pressure letdown device 350. The bend 352 may enable a downward connection to the outlet 82 of the second pressure letdown device 350, and the third cooling funnel 354 may facilitate the movement of the slag slurry 14 into the outlet 82 of the second pressure letdown device 350. As may be appreciated, the quantity of levels of water jets 356, the quantity of water jets per level, or the orientation of each of the water jets, or any combination thereof, may vary among embodiments of the third cooling funnel 354. For example, the third cooling funnel 354 may have a water jet 356 supplied by a flow control valve 358 of the cooling system 59. The second pressure letdown device 350 may operate in a similar manner to the first pressure letdown device 230.

Figure 8:
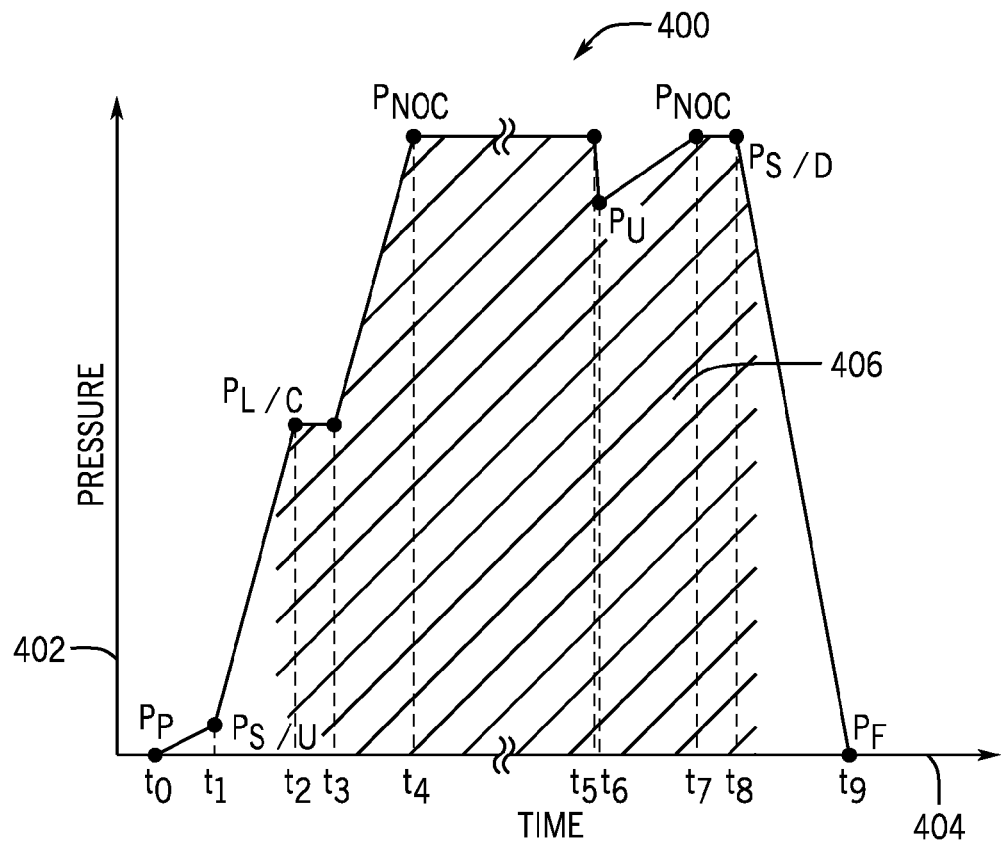
FIG. 8 is a chart illustrating a gasifier operating pressure profile.

FIG. 8 is a chart 400 illustrating a gasifier operating pressure 402 versus time 404 for an embodiment of a gasifier operating campaign of length $t_0$-$t_9$. As may be appreciated, the time scale between $t_4$ and $t_5$ has been compressed, as shown by the broken lines between $t_4$ and $t_5$. The various pressure levels of the gasifier are identified as follows:

$P_P$ is the pressure when gasifier preheat is complete and the inert gas purge of the gasification plant hot gas path is initiated. It is essentially equal to atmospheric pressure.

$P_{S/U}$ is the pressure at gasifier startup. It is slightly above atmospheric pressure because of the accumulation of inert purge gas within the gasification system.

$P_{L/C}$ is a temporary hold pressure between $P_{S/U}$ and normal operating pressure at which point a leak check is done throughout the gasification plant. There may be more than one $P_{L/C}$ hold pressures depending on how high the gasifier operating pressure is and on how extensively the plant may have been opened up for maintenance prior to startup.

$P_{NOC}$ is the normal operating condition pressure of the gasifier, which can be anywhere from about 2413 to 8274 kPa (e.g., 350 to 1200 psig), depending on the plant.

$P_U$ represents a hypothetical rapid drop in gasifier pressure that may result from a system upset, perhaps in an operating unit immediately downstream of the gasifier.

$P_{S/D}$ is pressure of the system at gasifier shutdown. In this case, $P_{S/D}$ is shown as being the same as $P_{NOC}$. However, the gasification plant pressure may be reduced prior to shutdown in order to reduce the inventory of product gas left in the system after shutdown. Nevertheless, $P_{S/D}$ is greater than atmospheric pressure because the residual pressure in the system is used to drive certain process flows during the shutdown process.

$P_F$ is the final pressure of the gasifier after all shutdown procedures have been completed. It is essentially equal to atmospheric pressure and/or to $P_P$.

Since the CSL system 200 reduces the pressure of the slag slurry 14 (e.g., slag and water) from gasifier pressure to approximately atmospheric pressure (e.g., $P_P$), the pressure profile shown in FIG. 8 illustrates the kinds of pressure differentials that the CSL system 200 may produce as a function of time 404.

Also shown in FIG. 8 is a shaded area 406 that represents approximately when, during a gasifier operating campaign, the CSL system 200 handles the slag slurry 14 as described above. As may be appreciated, slag slurry 14 may not begin to enter the CSL system 200 immediately upon startup (e.g., at $t_0$) because it takes time (e.g., an accumulation duration) for slag to accumulate on the wall of the gasifier reaction chamber 20, to flow out of the reaction chamber 20, and to accumulate to any degree within the quench chamber 22. FIG. 8 shows the point of slag entrance into the CSL system 200 occurring at a time between gasifier startup $P_{S/U}$ (e.g., $t_1$) and the hold point for gasifier leak checks $P_{L/C}$ (e.g., $t_2$). This represents the case where a gasifier has been previously operated and some slag was left on the gasifier wall. For the case of a new gasifier or a gasifier with a new refractory lining in the reaction chamber 20, the left edge of the shaded area 406 may be pushed closer to $t_4$ or a time between $t_4$ and $t_5$. With respect to shutdown, the CSL system may be operated for a period of time after the gasifier had been stopped in order to reduce the amount of residual slag left in the CSL system.

Figure 9A:
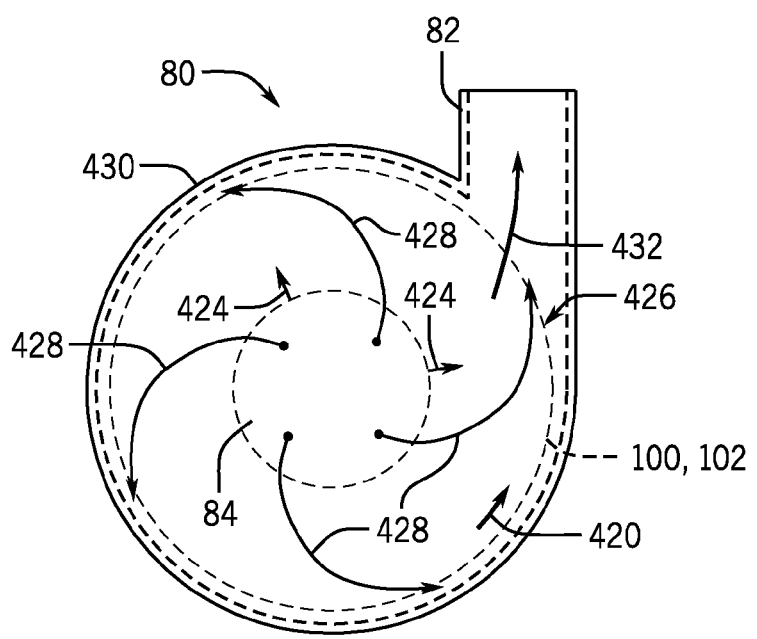
FIGS. 9A and 9B are cross-sections of a rotating parallel disc pump.
Figure 9B:
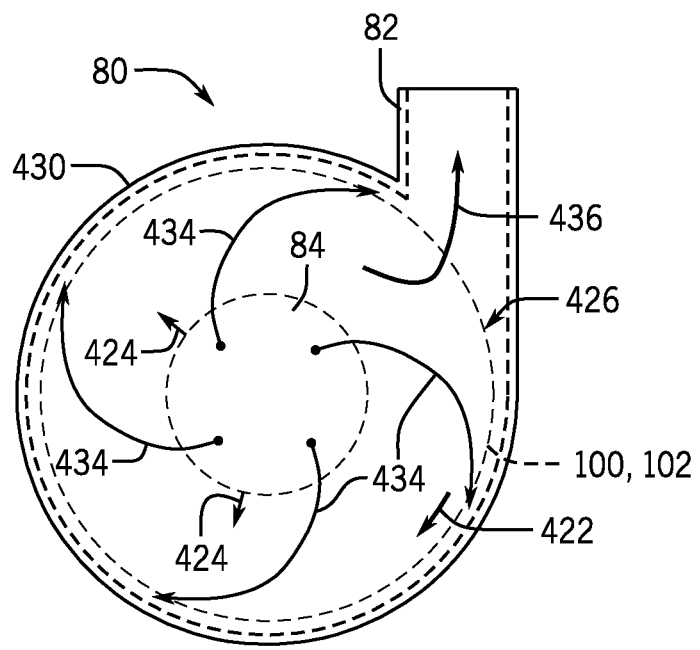

The rotating parallel disc pump 80 described above in FIGS. 2-4 may generate a positive flow of fluid from the inlet 84 to the outlet 82 regardless of the direction of rotation of the opposing discs. FIGS. 9A and 9B are cross-sections of a rotating parallel disc pump (e.g., continuous pressure letdown devices 230, 350), illustrating end-view cross-sections of the disc pump, where FIG. 9A illustrates a conventional (e.g., counterclockwise 420) rotation of both discs 100, 102, and FIG. 9B illustrates a reverse (e.g., clockwise) rotation of both discs. Because the rotating parallel discs 100, 102 transfer momentum to the fluid (e.g., slag slurry 14) between them regardless of the direction of rotation, both conventional 420 and reverse 422 rotation generate a centrifugal force that moves the fluid in a radially outward direction 424 from the inlet (e.g., eye) 84 of the inflow disc to the peripheral edge 426 of both discs. The solid arrows 428 in FIG. 9A from the inlet 84 of the inflow disc to the pump casing 430 illustrate the movement of fluid between the discs 100, 102 during conventional (e.g., counterclockwise 420) rotation, in which the discs 100, 102 rotate in the counterclockwise direction 420 that is substantially towards the outlet 82. With rotation in the conventional counterclockwise direction 420, the flow of fluid exiting the discs 100, 102 substantially aligns with the flow of fluid exiting through the outlet 82, as shown by the relatively straight arrow 432 through the outlet 82. The solid arrows 434 in FIG. 9B from the inlet 84 of the inflow disc to the pump casing 430 illustrate the movement of fluid between the discs 100, 102 during reverse (e.g., clockwise 122) rotation, in which the discs 100, 102 rotate in the clockwise direction 422 that is substantially away from the outlet 82. With rotation in the reverse (e.g., clockwise 422) direction, the flow of fluid exiting the discs 100, 102 does not align with the flow of fluid exiting through the outlet 82, as shown by the bent arrow 436 through the outlet 82. Because of this misalignment in the reverse rotation embodiment of FIG. 9B, the fluid makes a sharp turn to enter the outlet 82, as shown by the bent arrow 436 through the outlet 82. This sharp bending of the fluid streamlines consumes some energy, thereby decreasing the efficiency of the reverse rotation (e.g., clockwise 422) mode relative to the conventional rotation (e.g., counterclockwise 420) mode. Nevertheless, counterclockwise 420 and clockwise 422 rotation of the discs 100, 102 may pump fluids (e.g., slag slurry 14) from the inlet 84 of the inflow disc to the outlet 82. Additionally, both directions of rotation may be used in a CSL system 200 for continuously depressuring a solids flow (e.g., slag slurry 14) from a higher pressure to a lower pressure.

Figure 10:
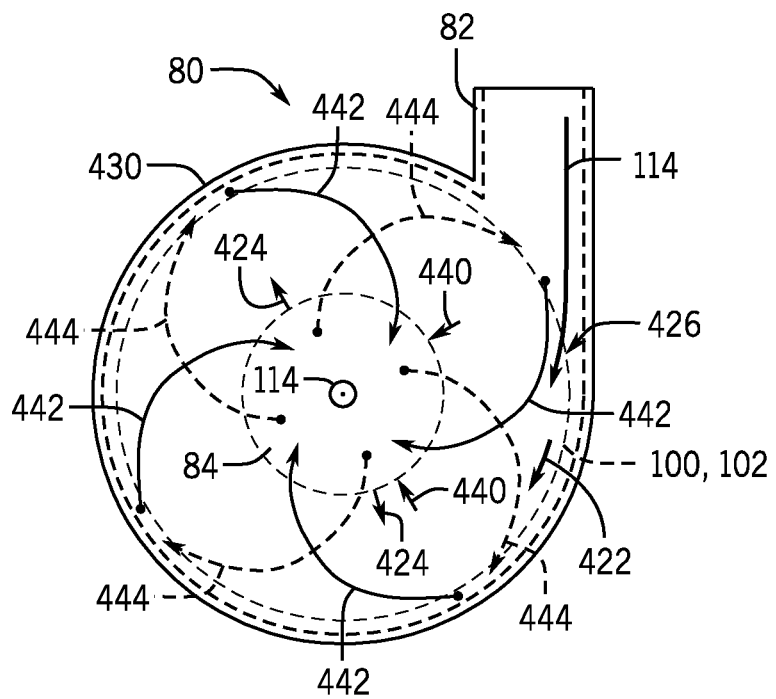
FIG. 10 is a cross-section of a rotating parallel disc pump in a letdown turbine mode or a reverse-acting pump mode.

The rotating parallel disc pump 80 may be utilized in at least two modes as a pressure letdown device 230, 350 for water slurries containing solid particulate matter (e.g., slag). The first mode is herein called "letdown turbine mode." The second mode is called "reverse-acting pump mode." Both the letdown turbine mode and the reverse-acting pump mode may operate the rotating parallel disc pump 80 in reverse (e.g., clockwise 422) rotation, with the discs 100, 102 spinning away from the outlet 82, as illustrated in FIG. 10. As may be appreciated, rotating parallel disc pumps 80 illustrated in FIGS. 1, 2, and 5-7 may operate in the letdown turbine mode and/or the reverse-acting pump mode, as discussed in detail below.

In letdown turbine mode, the high pressure slag-water slurry from the gasifier quench chamber enters the reverse-acting pump's tangential outlet 82, moves in the clockwise direction 422 through the pump 80, and causes the discs 100, 102 to spin in a clockwise direction 422, as shown in FIG. 10. The clockwise 422 and radially inward 440 movement of slag and water through the discs 100, 102 is shown by the solid arrows 442 in FIG. 10. However, because of the no-slip condition on the surfaces of the discs 100, 102 and the centrifugal force generated by the rotation of the discs 100, 102, radially outward 424 momentum is transferred to the fluid adjacent to the discs 100, 102. This causes the fluid in a thin layer next to the discs 100, 102 to move clockwise 422 and radially outwards 424, as shown by the dashed arrows 444 in FIG. 10. Consequently, a recirculation pattern is set up close to the disc surfaces 100, 102 in which a thin layer of fluid moves radially outwards 424 with arrows 444, but in which the majority of the fluid moves radially inwards 440 with arrows 442. The fluid (e.g., slag slurry 14) that reaches the inlet 84 of the inflow disc (via the path shown by the solid arrows 442) moves axially outwards (e.g., out of the page) through the inlet 84 and leaves the reverse-acting pump 80 through the suction port, as shown by arrow 114.

The rotational rate of the disc 100, 102 in the turbine letdown mode may be controlled by a brake, such as the eddy current brake or friction brake, attached to the pump shaft. The brake provides the resistance against which the discs 100, 102 turn. The pressure drop and, therefore, the flow rate, generated by the reverse-acting pump 80 in the letdown turbine mode is a function of the work that is extracted from the fluid by the braking system. By increasing or decreasing the resistance to rotation, the brake may be used to increase or decrease, respectively, the pressure drop. Additionally, or in the alternative, by increasing or decreasing the resistance to rotation, the brake may be used to decrease or increase, respectively, the flow rate of the slag-water slurry as it moves through the reverse-acting pump 80. Note that, in another embodiment, an alternative load, such as an electric generator, may be used instead of a brake. Moreover, as discussed above, the controller may adjust the spacing between the discs 100, 102 to affect the pressure drop, the flow rate, or the particle size, or any combination thereof.

In reverse-acting pump mode, the flow pattern of high pressure slag-water slurry through the reverse-acting pump is similar to the flow pattern in letdown turbine mode, as illustrated in FIG. 10. However, whereas the clockwise 422 motion of the discs in the letdown turbine mode is driven by the motion of the slurry, the discs 100, 102 are externally driven by a motor (e.g., variable speed motor) connected to the shaft in reverse-acting pump mode. As discussed above with FIG. 4, the fluid between the discs 100, 102 recirculates within the reverse-acting pump whenever the pump is deadheaded (e.g., discharge pressure generated by the rotation of the discs 100, 102 is approximately equal to the upstream pressure at the outlet 82). As discussed with FIG. 4, fluid will flow backwards (e.g., backflow) through the reverse-acting pump whenever the pressure at the discharge (e.g., outlet 82) of the reverse-acting pump exceeds the delivery pressure generated by the reverse-acting pump at the speed at which it is rotating. Thus, the backflow 114 condition shown in FIGS. 4 and 10 can be created in several ways: 1) by causing the upstream pressure at the discharge (e.g., outlet 82) of the reverse-acting pump to exceed the pressure that the reverse-acting pump is capable of delivering, 2) by reducing the speed of the reverse-acting pump so that its delivery pressure falls below the upstream pressure of the system connected to the discharge (e.g., outlet 82) of the reverse-acting pump, or 3) increasing the spacing between the discs 100, 102 of the reverse-acting pump so that its delivery pressure falls below the upstream pressure of the system connected to the discharge (e.g., outlet 82) of the reverse-acting pump. When the reverse-acting pump is connected to a variable speed motor, decreasing the speed of the reverse-acting pump will increase the amount of backflow 114 through the reverse-acting pump, and increasing the speed of the reverse-acting pump will decrease the amount of backflow 114. In fact, with an appropriately sized variable speed motor and a suitably sized rotating parallel disc pump 80, fluid (liquids, slurries, etc.) can be both pumped into a high pressure vessel or depressurized from the high pressure vessel by adjusting the speed of the reverse-acting pump. In some embodiments, the dimensions and rotational speed of a rotating parallel disc pump 80 used in reverse-acting pump mode may differ from the dimensions and rotational speed of a rotating parallel disc pump 80 used in letdown turbine mode.

The following paragraphs provide details of the methods of operation and control for the CSL systems 200 shown in FIGS. 6 and 7 when operated in both letdown turbine mode and reverse-acting pump mode. Operational procedures are provided for startup, normal operation, shutdown, and upset response. Some embodiments of the CSL systems 200 may utilize a computerized control system (e.g., controller 18) to receive inputs from the sensors shown in FIGS. 6 and 7, and to generate outputs for the control devices (e.g., valves (206, 208, 220, 222, 246, 250, 254, 268, 278, 300, 358), variable speed motors 86, clutches 234, brakes 238, 240). Sensors coupled to the controller 18 may include, but are not limited to temperature sensors (e.g., $T_0$, $T_1$, $T_2$, $T_3$), pressure sensors (e.g., $P_0$, $P_1$, $P_2$, $P_3$, $P_4$), flow meters (e.g., $F_0$, $F_1$, $F_2$, $F_3$, $F_4$, $F_5$, $F_6$, $F_7$), gas composition sensors ($A_1$), level sensors ($L_1$, $L_2$), or speed sensors 236, or any combination thereof. In some embodiments, human operator input may be utilized for entering appropriate control set points (e.g., target pressure $P_3$ at the inlet to the hydrocyclone 252) into the computerized control system. The computerized control system (e.g., controller 18) may be configured to monitor and operate the CSL system 200.

Letdown Turbine Mode

The following paragraphs describe the operation of the CSL system 200 illustrated in FIG. 6 configured in the letdown turbine mode, where the gasifier 12 coupled to the CSL system 200 operates at the gasifier pressures over time described by the chart of FIG. 8. As may be appreciated, initial conditions for operating the CSL system 200 of FIG. 6 in letdown turbine mode may include, but are not limited to:

1) closing all valves (e.g., 206, 208, 220, 222, 246, 250, 254, 268, 278, 300);

2) turning the one or more letdown turbine motors 86 off and/or activating the eddy current brake 238 or friction brake 240 such that the letdown turbine rotor speed is approximately zero;

3) turning other pumps off (e.g., 264, 282, 308, 312);

4) turning the vacuum belt filter 256 off;

5) establishing initial water levels in the quench chamber 22, the vacuum belt filter unit 256, the water sump 262, and the flash tank 270;

6) filling the slag crusher 64, the first cooling funnel 204, the letdown turbine 230, the second cooling funnel 244, the hydrocyclone 252, and other connecting pipes with fluid (e.g., water).

The startup sequence for the CSL system 200 of FIG. 6 in letdown turbine mode may include, but is not limited, to the following:

1) After gasifier 12 startup, allow quench chamber pressure $P_0$ to build to a level that exceeds the minimum pressure that overcomes frictional resistance and rotates the letdown turbine (e.g., reverse-acting pump 230) at the slowest speed at which it will turn smoothly. This pressure, which is somewhere between $P_{S/U}$ and $P_{L/C}$ in FIG. 8, is the letdown turbine startup trigger pressure, $P_{S/T}$.

2) When quench chamber pressure $P_0 > P_{S/T}$, turn on the variable speed motor 86, engage the clutch 234 and start rotating the turbine 230 in the reverse rotation direction 422 at startup speed, i.e. the rotational speed that is appropriate for $P_{S/T}$.

3) Place backpressure control valve 268, flash tank level control valve 278 and water makeup valve 300 in automatic control mode and at their startup set points.

4) Open valves 254, 222, 220 and 250, in that order, to initiate flow through the system. (Note that steps 2, 3, and 4 can be done in relatively quick succession by the controller 18.)

5) Turn on cooling water recirculation pump 282 and open cooling water flow control valves 206, 208 and 246 to their initial operating set points. The initial set points are chosen in order to provide a minimum flow rate of water to the cooling jets that establishes the swirling motion within cooling funnels 204 and 244 to facilitate the movement of slag into the smaller diameter inlets of the letdown turbine 230 and the hydrocyclone 252.

6) Start vacuum belt filter 256 and pumps 264, 308 and 312 with the controller 18 so that the water levels in the vacuum belt filter unit 256 and the water sump 262 are automatically maintained throughout the operation of the CSL system 200.

7) As slag slurry 14 and cooling jet water begins to flow through the letdown turbine 230 and as the quench chamber pressure continues to build, the mass flow through the letdown turbine 230 will increase and, as a result, the speed of the letdown turbine 230 will tend to want to increase beyond the speed of the motor. When this point is reached, the controller 18 will detect this unloading of the motor, disengage the clutch 234 (and thus, disengage the motor 86), and engage the eddy current brake 238 and/or the friction brake 240. Using input from letdown turbine speed sensor 236, from pressure sensors $P_0$, $P_1$, and $P_3$, and from flow rate sensors $F_1$ and $F_3$, the controller 18 will adjust the resistance of the eddy current brake 238 to extract work from the depressurizing slag-water stream which will, in turn, generate a pressure drop (e.g., $\Delta P$) across the letdown turbine 230. By adjusting the pressure drop (e.g., $\Delta P$) across the letdown turbine 230, the controller 18 can ensure that the pressure $P_3$ of the depressurized slag slurry 14 is just enough to drive the slag slurry 14 through the rest of the downstream portion 224 of the CSL system 200.

8) As quench chamber pressure $P_0$ continues to increase to $P_{NOC}$, the controller 18 uses one or more of the pressure inputs and/or one or more of the flow rate inputs listed in step 7 to continuously adjust the resistance generated by the brake 238, 240 in order to increase the pressure drop across the letdown turbine 230 so that the target pressure $P_3$ at the inlet to the downstream equipment is maintained. Once $P_{NOC}$ is reached, the controller 18 continues to monitor the input from the one or more sensors in order to adjust the brake resistance to maintain $P_3$ at the proper pressure, i.e. the pressure that drives the slag slurry 14 through the rest of the system downstream of the letdown turbine 230.

9) As quench chamber pressure $P_0$ continues to increase to $P_{NOC}$, the temperature of the slag slurry 14 and the quantity of dissolved gases within the slag slurry 14 will also increase to normal operating levels. Although the rotating parallel disc pump 230 is capable of tolerating a significant amount of degassing within the pump, the slag slurry 14 may be degassed by downstream equipment that is specifically designed for that purpose. For example, the slag slurry 14 may preferably be degassed by downstream degassing equipment. Degassing may be done by cooling the slag slurry 14 to suppress the tendency to degas within the letdown turbine 230. Using inputs from the temperature sensors ($T_0$, $T_1$, and $T_3$), the pressure sensors ($P_0$, $P_1$, $P_3$, $P_4$), the flow rate sensors ($F_1$, $F_3$, $F_6$), and the gas composition sensor ($A_1$), the controller 18 uses an algorithm to calculate a cooling target temperature $T_{CT}$ to which the slag slurry 14 entering the letdown turbine 230 is to be cooled in order to effectively shift at least some (e.g., 20, 30, 40, 50, 60, 70, 80, 90, 95 percent or more) of the degassing from inside the letdown turbine 230 to inside the flash tank 270. The controller 18 then uses this cooling target temperature $T_{CT}$ to adjust the settings of cooling water flow control valves 206 and 208 to add more water to reduce the slag slurry temperature below $T_{CT}$. In the event that the slag slurry temperature is already below $T_{CT}$, the controller 18 may calculate a desired negative or reduced cooling water flow. In some embodiments, the controller 18 may not reduce the flow rate of cooling water through valves 206, 208 or 246 below the minimum flow rate that achieves effective movement of the slag slurry 14 through cooling funnels 204 and 244, into the letdown turbine 230, and into the hydrocyclone 252.

10) As the flow rate of cooling water through flow control valves 206 and 208 is increased to lower the slag slurry temperature, the total flow rate of material through the letdown turbine 230 will increase. This, in turn, may cause the rotating discs of the letdown turbine 230 to rotate faster. The controller 18 may compensate for this tendency to increase the rotational speed of the discs as cooling water is added by further increasing the resistance to rotation applied by the eddy current brake 238. Moreover, as discussed above, the controller 18 may adjust the spacing 118 between the discs 100, 102 to affect the pressure drop, the flow rate, or the particle size, or any combination thereof. For example, the controller 18 may increase the spacing 118 as additional cooling water is added, thereby slowing the rotation of the discs 100, 102. In some embodiments, the controller 18 may control the spacing 118 between the discs 100, 102 in combination with controlling the eddy current brake 238.

The operation of the CSL system 200 of FIG. 6 in letdown turbine mode during approximately times $t_4$ to $t_5$ and $t_7$ to $t_8$, as shown in FIG. 8, may be referred to as normal operation of the CSL system 200. During normal operation, conditions within the gasifier 12 are held steady, to the extent possible, as long as the gasifier 12 is running. This means that the following process parameters are relatively constant: quench chamber pressure $P_0$, temperature $T_0$ and liquid level and the flow rate $F_1$ of slag and water into the CSL system 200. Goals of the CSL system controller 18 during normal operation may include, but are not limited, to maintaining a steady hydrocyclone inlet pressure $P_3$ regardless of fluctuations in quench chamber pressure $P_0$, maintaining a steady flow rate of slag slurry 14 through the CSL system 200, and maintaining a steady temperature profile through the CSL system 200 so that the majority of degassing occurs in the flash tank 270. As may be appreciated, maintaining a steady hydrocyclone inlet pressure $P_3$ may be essentially the same as maintaining a constant pressure drop ($\Delta P$) across the letdown turbine 230. The CSL system controller 18 may maintain a steady hydrocyclone inlet pressure $P_3$ and maintain a steady flow rate $F_1$ of slag slurry 14 through the CSL system 200 by adjusting the resistance applied by the eddy current brake 238, the friction brake 240, or by adjusting the spacing between the discs, or any combination thereof. The steady temperature profile through the CSL system 200 may be maintained by adjusting the flow rate $F_4$ of cooling water to the cooling funnels 204 and 244.

Occasionally the controller 18 of the CSL system 200 will respond to an upset somewhere in the gasification plant or associated process units that impacts the CSL system 200. The most common upsets are a sudden increase in quench chamber liquid level and/or a sudden change in quench chamber pressure $P_0$. Other upsets (e.g., changes in slag production, changes in quench chamber temperature $T_0$) may occur relatively slowly over time and may be compensated for by the controller 18 during normal operation.

Increase in Quench Chamber Level:

Three flows affect the liquid level in the quench chamber 22: the supply of fresh quench water, the spent quench water (e.g., black water) blowdown stream, and the water in the slag slurry 14. Occasionally upsets in the black water blowdown system can reduce the flow of black water, thereby causing a sudden increase in quench chamber liquid level. When this occurs, the CSL system 200 may depressurize additional water in order to maintain the quench chamber liquid level while the black water blowdown system upset is resolved. In order to allow more water to pass through the CSL system 200 along with the slag, the controller 18 reduces the resistance applied by the eddy current brake 238 or friction brake 240, thereby reducing the pressure drop generated by the letdown turbine 230. Additionally, the controller 18 may increase the spacing between the discs 100, 102, thereby reducing the pressure drop generated by the letdown turbine 230. This reduced pressure drop drives more water through the CSL system 200 along with the slag. Additionally, the controller 18 may adjust the response of the downstream equipment (vacuum belt filter 256, water sump pumps 308, 312, flash tank pump 282) of the depressurized slag-slurry handling subsystem to allow for a higher flow rate of water through the vacuum belt filter unit 256 and water sump 262 and to allow for a higher flow rate of cooling water to the cooling funnels 204, 244. The CSL system controller 18 receives black water flow rate information from the gasifier control computer in order to receive an early warning about an impending quench liquid level upset. When the black water system event is resolved, the CSL system controller 18 reverses the changes that were made, thereby returning the CSL system 200 to normal operation in letdown turbine mode.

Change in Quench Chamber Pressure:

A sudden change in quench chamber pressure $P_0$ is usually a result of a change in pressure or flow rate in another processing unit connected to the gasifier 12. FIG. 8 illustrates such a change as a sudden drop from normal operating pressure $P_{NOC}$ to upset pressure $P_U$. When this occurs, the driving force for movement of slag slurry 14 into the CSL system 200 suddenly decreases, which means that the flow of slag slurry 14 also decreases. To compensate for this, the controller 18 reduces the resistance of the eddy current brake 238, reduce the resistance of the friction brake 240, or increases the spacing 118 between the discs 100, 102 to reduces the pressure drop ($\Delta P$) through the letdown turbine 230. This allows the gasifier 12 and the CSL system 200 to operate at a reduced pressure. Once the pressure upset is resolved, the controller 18 reverses the changes that were made to the operation of the CSL system 200, thereby resuming normal operation.

When the gasifier 12 is shut down, the feeds (e.g., carbonaceous feedstock 26, oxygen 28) to the gasifier 12 are stopped and the production of hot syngas and molten slag cease. Then, a series of activities is completed that includes depressuring the gasifier 12, allowing the gasification system to cool down and decreasing liquid levels and process flow rates throughout the gasification system. All of these activities impact the operation of the CSL system 200 during the shutdown period. In addition, residual molten slag that had accumulated on the wall of the gasifier reaction chamber 20 during operations continues to flow into the quench chamber 22 until the temperatures become too cool for the slag to flow. Thus, slag flow into the CSL system 200 continues for a portion of the gasifier shutdown period ($t_8$ to $t_9$), and then it ceases, as shown by the hatched area in FIG. 8. The decrease in gasifier pressure from $P_{S/D}$ to $P_F$, as shown in FIG. 8, decreases the desired pressure drop of the CSL system 200. The reduction in flow rate of fresh quench water to the quench chamber 22 reduces the flow rates of water taken through the CSL system 200 and the black water blow down system in order to maintain a steady level in the quench chamber 22. The cooling of temperatures throughout the gasification system as a result of heat loss results in cooler temperatures within the quench chamber 22. Accordingly, cooler temperature slag slurry 14 may enter the CSL system 200 during shutdown of the gasifier 12.

The CSL system controller 18 senses the decreasing temperatures ($T_0$, $T_1$, $T_3$) that occur during the shutdown period and reduces the flow rate of cooling water to cooling funnels 204 and 244 in order to maintain the desired temperature profile through the CSL system 200. A gasification plant control may direct the CSL controller 18 to reduce the flow rate $F_1$ of slag slurry 14 into the CSL system 200 in order to help maintain a steady liquid level inside the quench chamber 22. In calculating the adjustment to be made to the operation of the letdown turbine 230 during the shutdown period, the controller 18 accounts for the decreasing flow rate of cooling water through the system, the direction from the gasification plant control to reduce the flow rate of slag slurry 14 in order to help maintain the quench chamber liquid level, and the overall reduction in system pressure resulting from the depressurization of the gasifier 12. In responding to the reduced cooling water flow and the request for reduced slag slurry flow, the controller 18 may increase the rotational resistance applied by the eddy current brake 238 and/or decrease the spacing between the discs 100, 102. Increased flow resistance in the letdown turbine 230 will decrease flow rate of the slag slurry 14. In responding to the decreased driving force resulting from the decrease in quench chamber pressure $P_0$, the controller 18 may decrease the rotational resistance applied by the eddy current brake 238 and/or increase the spacing between the discs 100, 102. The appropriate amount of decreased flow resistance in the letdown turbine 230 will maintain the same flow rate through the letdown turbine 230 despite the presence of a decreased pressure driving force. Thus, decreasing the resistance applied by the eddy current brake 238 and/or increasing the spacing between the discs 100, 102 in response to decreasing system pressure to some extent counterbalances increasing the resistance applied by the eddy current brake 238 and/or decreasing the spacing between the discs 100, 102 in response to the decreasing flow rate of cooling water and the direction from the gasification control to decrease the flow of slag slurry 14 into the CSL system 200. This complex counterbalancing calculation is carried out by a shutdown control algorithm in the CSL controller 18, which adjusts the eddy current brake 238 setting to allow slag slurry 14 and cooling water to flow through the CSL system 200 at reduced flow rates at the same time that the overall system pressure is declining. Eventually, the slag 58 that remained in the quench chamber 22 will be depressurized through the CSL system 200. The absence of slag through the CSL system 200 may be detected by a torque sensor on the slag crusher 64, by weight sensors on the vacuum belt filter 256, by a torque sensor on the vacuum belt filter motor, or by visual inspection of the vacuum belt filter 256, or any combination thereof. Once slag flow has ceased, the CSL system 200 is turned off using at least some of the steps of the following sequence:

1) Cooling water flow control valves 206, 208 and 246 are closed and the cooling water circulation pump 282 is turned off.

2) If the gasifier 12 and CSL system 200 will be shortly restarted, valves 254 and 278 will be closed followed by valves 220, 250 and 222. This will preserve the liquid levels in the system for restarting. With the closure of valves 220 and 250, the rotation of the discs will come to a halt due to a lack of flow though the letdown turbine 230.

3) If the gasifier 12 and CSL system 200 will be shut down for extended maintenance, valve 220 will close to isolate the CSL system 200 from the gasifier 12. But valves 222, 250, 254 and 278 will remain open to allow fluid to drain from the letdown turbine 230, hydrocyclone 252, and flash tank 270 into the vacuum belt filter unit 256 and the water sump 262. Once draining is complete, all open valves are closed.

4) Pumps 264, 282 and 308 are turned off.

The following paragraphs describe the operation of the CSL system 200 illustrated in FIG. 7 configured in the letdown turbine mode, where the gasifier 12 coupled to the CSL system 200 operates at the gasifier pressures over time described by the chart of FIG. 8. As may be appreciated, initial conditions for operating the CSL system 200 of FIG. 7 in letdown turbine mode may include, but are not limited, to:

1) closing all valves (e.g., 206, 208, 220, 222, 246, 250, 254, 268, 278, 300, 358);
2) turning the one or more letdown turbine motors 86 off and/or activating the eddy current brakes 238 or the friction brakes 240 such that the letdown turbine rotor speeds are approximately zero;
3) turning other pumps off (e.g., 264, 282, 308, 312);
4) turning the vacuum belt filter 256 off;
5) establishing initial water levels in the quench chamber 22, the vacuum belt filter unit 256, the water sump 262, and the flash tank 270;
6) filling the slag crusher 64, the first cooling funnel 204, the letdown turbine 230, the second cooling funnel 244, the third cooling funnel 354, the hydrocyclone 252, and other connecting pipes with fluid (e.g., water).

The startup sequence for the CSL system 200 of FIG. 7 in letdown turbine mode may include, but is not limited, to the following:

1) After gasifier 12 startup, allow quench chamber pressure $P_0$ to build to a level that exceeds the minimum pressure that overcomes frictional resistance and rotates the letdown turbine (e.g., reverse-acting pump 230) at the slowest speed at which it will turn smoothly. This pressure, which is somewhere between $P_{S/U}$ and $P_{L/C}$ in FIG. 8, is the letdown turbine startup trigger pressure, $P_{S/T}$. As may be appreciated, the trigger pressure $P_{S/T}$ of an embodiment of the CSL system 200 of FIG. 7 may be higher than the trigger pressure $P_{S/T}$ of a comparable embodiment of the CSL system 200 of FIG. 6 because of a greater pressure $P_0$ in the quench chamber 22 needed to overcome the friction resistance to turning the two letdown turbines 230, 350 in series of the embodiment of the CSL system 200 of FIG. 7 relative to the embodiment of the CSL system 200 of FIG. 6.

2) When quench chamber pressure $P_0 > P_{S/T}$, turn on the variable speed motors 86, engage the clutches 234 and start rotating the turbines 230 and 350 in the reverse rotation direction 422 at startup speed, i.e. the rotational speed that is appropriate for $P_{S/T}$.

3) Place backpressure control valve 268, flash tank level control valve 278 and water makeup valve 300 in automatic control mode and at their startup set points.

4) Open valves 254, 222, 220 and 250, in that order, to initiate flow through the system. (Note that steps 2, 3, and 4 can be done in relatively quick succession by the controller 18.)

5) Turn on cooling water recirculation pump 282 and open cooling water flow control valves 206, 208, 246, and 358 to their initial operating set points. The initial set points are chosen in order to provide a minimum flow rate of water to the cooling jets that establishes the swirling motion within cooling funnels 204, 244, and 354 to facilitate the movement of slag into the smaller diameter inlets of both the letdown turbines 230, 350 and the hydrocyclone 252.

6) Start vacuum belt filter 256 and pumps 264, 308 and 312 with the controller 18 so that the water levels in the vacuum belt filter unit 256 and the water sump 262 are automatically maintained throughout the operation of the CSL system 200.

7) As slag slurry 14 and cooling jet water begins to flow through the letdown turbines 230, 350 and as the quench chamber pressure continues to build, the mass flow through the letdown turbines 230, 350 will increase and, as a result, the speeds of the letdown turbines 230, 350 will tend to want to increase beyond the speeds of the motors. When this point is reached, the controller 18 will detect this unloading of the motors, disengage the clutches 234 (and thus, disengage the motors 86), and engage the eddy current brakes 238 and/or the friction brakes 240. The controller 18 may simultaneously control the first and second letdown turbines 230 and 350. Using input from letdown turbine speed sensors 236, from pressure sensors $P_0$, $P_1$, $P_2$ and $P_3$, and from flow rate sensors $F_1$, $F_2$ and $F_3$, the controller 18 will adjust the resistance of the eddy current brakes 238 and/or the friction brakes 240 to extract work from the depressurizing slag-water stream which will, in turn, generate a pressure drop ($\Delta P$) across each of the letdown turbines 230, 350. By adjusting the pressure drop ($\Delta P$) across each of the letdown turbines 230, 350, the controller 18 can ensure that the pressure $P_3$ of the depressurized slag slurry 14 is sufficient to drive the slag slurry 14 through the rest of the downstream portion 224 of the CSL system 200. The controller 18 may calculate the desired pressure drop across each of the two letdown turbines 230, 350, and adjust the resistance to rotation applied by both brakes so that each letdown turbine 230, 350 generates approximately half of the desired pressure drop ($\Delta P_{TOT}$) across the CSL system 200.

8) As quench chamber pressure $P_0$ continues to increase to $P_{NOC}$, the controller 18 uses one or more of the pressure inputs and/or one or more of the flow rate inputs listed in step 7 to continuously adjust the resistance generated by the brakes 238, 240 and/or to continuously adjust the spacing between the discs in order to increase the pressure drop across the letdown turbines 230, 350 so that the target pressure $P_3$ at the inlet to the downstream equipment is maintained. Once $P_{NOC}$ is reached, the controller 18 continues to monitor input from the one or more sensors in order to adjust the brake resistances and/or disc spacing to maintain $P_3$ at the proper pressure, i.e. the pressure that drives the slag slurry 14 through the rest of the system downstream of the letdown turbines 230, 350.

9) As quench chamber pressure $P_0$ continues to increase to $P_{NOC}$, the temperature of the slag slurry 14 and the quantity of dissolved gases within the slag slurry 14 will also increase to normal operating levels. Although the rotating parallel disc pumps 230, 350 are capable of tolerating a significant amount of degassing within the pumps, the slag slurry 14 may be degassed by downstream equipment that is specifically designed for that purpose. For example, the slag slurry 14 may preferably be degassed by downstream degassing equipment. Degassing may be done by cooling the slag slurry 14 to suppress the tendency to degas within the letdown turbines 230, 350. Using inputs from the temperature sensors ($T_0$, $T_1$, $T_2$, and $T_3$), the pressure sensors ($P_0$, $P_1$, $P_2$, $P_3$, $P_4$), the flow rate sensors ($F_1$, $F_2$, $F_3$, $F_6$), and the gas composition sensor ($A_1$), the controller 18 uses an algorithm to calculate a cooling target temperature $T_{CT}$ to which the slag slurry 14 entering the letdown turbine 230 is to be cooled in order to effectively shift at least some (e.g., 20, 30, 40, 50, 60, 70, 80, 90, 95 percent or more) of the degassing from inside the letdown turbines 230, 350 to inside the flash tank 270. The controller 18 then uses this cooling target temperature $T_{CT}$ to adjust the settings of cooling water flow control valves 206 and 208 to add more water to reduce the slag slurry temperature below $T_{CT}$. In the embodiment of the CSL system 200 of FIG. 7 in letdown turbine mode, the algorithm of the controller 18 may calculate $T_{CT}$ to add the additional cooling water to cooling funnel 204 via flow control valves 206 and 208. Determining $T_{CT}$ via an algorithm in which all of the cooling water is added to 204 rather than apportioning the additional water between 204 and 354 enables both letdown turbines 230, 350 to handle the same mass flow rate. This determination of $T_{CT}$ may enable the controller 18 to use similar set points for the brakes 238, 240 and/or the disc spacing actuators 120 on the two letdown turbines 230, 350. In the event that the slag slurry temperature is already below $T_{CT}$, the controller 18 may calculate a desired negative or reduced cooling water flow. In some embodiments, the controller 18 may not reduce the flow rate of cooling water through valves 206, 208, 246, or 358 below the minimum flow rate that achieves effective movement of solids through cooling funnels 204, 244, 354, into the letdown turbines 230, 350, and into the hydrocyclone 252.

10) As the flow rate of cooling water through flow control valves 206 and 208 is increased to lower the slag slurry temperature, the total flow rate of material through the letdown turbines 230, 350 will increase. This, in turn, may cause the rotating discs of the letdown turbines 230, 350 to rotate faster. The controller 18 may compensate for this tendency to increase the rotational speed of the discs as cooling water is added by further increasing the resistance to rotation applied by the brakes 238, 240 and/or by decreasing the spacing between the two sets of discs.

The operation of the CSL system 200 of FIG. 7 in letdown turbine mode during approximately times $t_4$ to $t_5$ and $t_7$ to $t_8$, as shown in FIG. 8, may be referred to as normal operation of the CSL system 200. During normal operation, conditions within the gasifier 12 are held steady, to the extent possible, as long as the gasifier 12 is running. This means that the following process parameters are relatively constant: quench chamber pressure $P_0$, temperature $T_0$ and liquid level and the flow rate $F_1$ of slag and water into the CSL system 200. Goals of the CSL system controller 18 during normal operation may include, but are not limited, to maintaining a steady hydrocyclone inlet pressure $P_3$ regardless of fluctuations in quench chamber pressure $P_0$, maintaining a steady flow rate of slag slurry 14 through the CSL system 200, and maintaining a steady temperature profile through the CSL system 200 so that the majority of degassing occurs in the flash tank 270. As may be appreciated, maintaining a steady hydrocyclone inlet pressure $P_3$ may be essentially the same as maintaining a constant pressure drop ($\Delta P_{TOT}$) across the letdown turbines 230, 350 of the CSL system 200. The CSL system controller 18 may maintain a steady hydrocyclone inlet pressure $P_3$ and maintain a steady flow rate $F_1$ of slag slurry 14 through the CSL system 200 by adjusting the resistances applied by the brakes 238, 240 and/or by adjusting the spacing between the two sets of discs. For example, the CSL system controller 18 may simultaneously adjust and apportion the resistances applied by the eddy current brake 238 on the first letdown turbine 230 and the eddy current brake 238 on the second letdown turbine 350. The steady temperature profile through the CSL system 200 may be maintained by adjusting the flow rates $F_4$, $F_7$, $F_5$ of cooling water to the cooling funnels 204, 354 and 244. To maintain the flow rate through both letdown turbines 230 and 350 approximately equal, the controller 18 may adjust the cooling water flow during normal operation only through flow control valves 206 and 208. Cooling water flow control valves 246 and 358 may be utilized for maintaining the swirl inducing jets in cooling funnels 244 and 354.

Occasionally the controller 18 of the CSL system 200 will respond to an upset somewhere in the gasification plant or associated process units that impacts the CSL system 200. The most common upsets are a sudden increase in quench chamber liquid level and/or a sudden change in quench chamber pressure $P_0$. Other upsets (e.g., changes in slag production, changes in quench chamber temperature $T_0$) may occur relatively slowly over time and may be compensated for by the controller 18 during normal operation.

Increase in Quench Chamber Level:

Three flows affect the liquid level in the quench chamber 22: the supply of fresh quench water, the spent quench water (e.g., black water) blowdown stream, and the water in the slag slurry 14. Occasionally upsets in the black water blowdown system can reduce the flow of black water, thereby causing a sudden increase in quench chamber liquid level. When this occurs, the CSL system 200 may depressurize additional water in order to maintain the quench chamber liquid level while the black water blowdown system upset is resolved. In order to allow more water to pass through the CSL system 200 along with the slag, the controller 18 reduces the resistance applied by the eddy current brakes 238 or friction brake 240 and/or increases the spacing between the two sets of discs, thereby reducing the pressure drop generated by the letdown turbines 230, 350. In some embodiments, the controller 18 may apportion the reduced resistance among the letdown turbines 230, 350 such that the pressure drop ($\Delta P$) across each letdown turbine 230, 350 is approximately equal. This reduced pressure drop drives more water through the CSL system 200 along with the slag. Additionally, the controller 18 may adjust the response of the downstream equipment (vacuum belt filter 256, water sump pumps 308, 312, flash tank pump 282) of the depressurized slag-water handling subsystem to allow for a higher flow rate of water through the vacuum belt filter unit 256 and water sump 262 and to allow for a higher flow rate of cooling water to the cooling funnels 204, 354, 244. The CSL system controller 18 receives black water flow rate information from the gasifier control computer in order to receive an early warning about an impending quench liquid level upset. When the black water system event is resolved, the CSL system controller 18 reverses the changes that were made, thereby returning the CSL system 200 to normal operation in letdown turbine mode.

Change in Quench Chamber Pressure:

A sudden change in quench chamber pressure $P_0$ is usually a result of a change in pressure or flow rate in another processing unit connected to the gasifier 12. FIG. 8 illustrates such a change as a sudden drop from normal operating pressure $P_{NOC}$ to upset pressure $P_U$. When this occurs, the driving force for movement of slag slurry 14 into the CSL system 200 suddenly decreases, which means that the flow of slag slurry 14 also decreases. To compensate for this, the controller 18 reduces the resistances of the eddy current brakes 238, the friction brake 240, and/or increases the spacing between the two sets of discs to reduce the pressure drop ($\Delta P$) through each of the letdown turbines 230, 350. In some embodiments, the controller 18 may apportion the reduced resistance among the letdown turbines 230, 350 such that the pressure drop ($\Delta P$) across each letdown turbine 230, 350 is approximately equal. This allows the gasifier 12 and the CSL system 200 to operate at a reduced pressure. Once the pressure upset is resolved, the controller 18 reverses the changes that were made to the operation of the CSL system 200.

When the gasifier 12 of the embodiment of the CSL system 200 illustrated in FIG. 7 is shut down in the letdown turbine mode, the controller 18 may control the operation of the CSL system 200 in a similar manner as described above for the CSL system 200 illustrated in FIG. 6 when shutting down in the letdown turbine mode. However, the controller 18 of the CSL system 200 illustrated in FIG. 7 may apportion the resistances applied by the brakes 238, 240 on the first letdown turbine 230 and the brake 238, 240 on the second letdown turbine 350 in response to the reduced cooling water flow and the request for reduced slag-water slurry flow, thereby enabling the pressure drop ($\Delta P$) across each letdown turbine 230, 350 to be approximately equal.

Reverse-Acting Pump Mode

The following paragraphs describe the operation of the CSL systems 200 illustrated in FIGS. 6 and 7 configured in the reverse-acting pump mode, where the gasifier 12 coupled to the CSL systems 200 operates at the gasifier pressures over time described by the chart of FIG. 8. As may be appreciated, initial conditions for operating the CSL systems 200 of FIGS. 6 and 7 in reverse-acting pump mode may include, but are not limited, to:

1) closing all valves (e.g., 206, 208, 220, 222, 246, 250, 254, 268, 278, 300, 358);

2) turning the one or more reverse-acting pump motors 86 off such that the rotor speeds of the one or more reverse-acting pumps 80 is approximately zero;

3) turning other pumps off (e.g., 264, 282, 308, 312);

4) turning the vacuum belt filter 256 off;

5) establishing initial water levels in the quench chamber 22, the vacuum belt filter unit 256, the water sump 262, and the flash tank 270;

6) filling the slag crusher 64, the first cooling funnel 204, the reverse-acting pump 230, the second cooling funnel 244, the hydrocyclone 252, and other connecting pipes with fluid (e.g., water). Additionally, in the case of the embodiment illustrated in FIG. 7, the reverse-acting pump 350 and the third cooling funnel 354 may be filled with fluid (e.g., water).

The one or more reverse-acting pumps 230, 350 of the CSL systems 200 are actively driven by the variable speed motors 86 to provide an adjustable resistance to the flow of slag-water slurry backwards through the pump via the central recirculation zone. In some embodiments, the design of reverse-acting pump internal components may be different from the design of the letdown turbine internal components. The reverse-acting pump 230, 350 may not utilize a clutch 234 to help start the rotation of the discs at low pressure. Instead of a clutch 234, some embodiments of the reverse-acting pump 230, 350 may be connected directly to a variable speed motor 86 via a common shaft 232. Additionally, or in the alternative, the reverse-acting pump 230, 350 may not utilize an eddy current brake 238 or backup friction brake 240 to slow down the rotation of the discs of the pump 230, 350.

Additionally, the one or more reverse-acting pumps 230, 350 may be turned on without waiting for a startup trigger pressure $P_{S/T}$, as described above with the startup of the letdown turbines. Therefore, the one or more reverse-acting pumps 230, 350 may be turned on before the gasifier 12 has started (e.g., gasifier pressure is approximately atmospheric pressure) at $t_0$. Accordingly, the CSL systems 200 of FIGS. 6 and 7 configured in reverse-acting pump mode may continue to operate to handle any residual slag that may drain out of the gasifier reaction chamber 20 if the gasifier 12 has been shut down for a brief time. When starting the gasifier 12 from a cold condition, the CSL system 200 can be turned on when the gasifier preheat temperature gets hot enough for slag that has accumulated on the wall of the reaction chamber 20 to begin flowing into the quench chamber 22.

The startup sequences for the CSL systems 200 of FIGS. 6 and 7 in reverse-acting pump mode may include, but are not limited, to the following:

1) Before the gasifier 12 starts, backpressure control valve 268, flash tank level control valve 278 and water makeup valve 300 can be placed in automatic control mode and at their respective startup set points.

2) With respect to the CSL system 200 of FIG. 6: after the gasifier 12 has started, turn on the reverse-acting pump 230 at the speed which is appropriate for producing the desired startup flow rate (measured at $F_1$) for the pump inlet pressure $P_1$. The controller 18 contains an algorithm that calculates the rotational speed that produces the flow resistance (i.e., pressure drop) in the reverse-acting pump 230 for any given flow rate $F_1$ at any given pump inlet pressure $P_1$ and inlet temperature $T_1$. With respect to the CSL system 200 of FIG. 7: after the gasifier 12 has started, turn on both reverse-acting pumps 230 and 350 at speeds appropriate for producing the desired startup flow rate (measured at $F_1$) for the pump inlet pressure $P_1$. Based on the first pump inlet pressure $P_1$ and inlet temperature $T_1$, the controller algorithm uses a similar algorithm to calculate the appropriate rotational speed for both reverse-acting pumps 230, 350 so that, when the valves (e.g., 220, 222, 250, 254) are opened to initiate flow through the CSL system 200, both reverse-acting pumps 230, 350 will generate the desired flow resistance (pressure drop) between them.

3) Open valves 220, 222, 250 and 254 in that order to initiate flow through the CSL system 200. With respect to the CSL system 200 of FIG. 6: once flow has started, the controller algorithm will readjust the speed of the variable speed motor 86 on pump 230 using feedback from flow meters $F_1$ and $F_3$ as well as pressures $P_1$ and $P_3$. With respect to the CSL system 200 of FIG. 7 with two reverse-acting pumps 230, 350: once flow has started, the controller algorithm will readjust the speed of the variable speed motors 86 on both pumps 230 and 350 using feedback from flow meters $F_1$, $F_2$, and $F_3$, as well as pressure sensors $P_1$, $P_2$, and $P_3$.

4) With respect to the CSL system 200 of FIG. 6: turn on cooling water recirculation pump 282 and open cooling water flow control valves 206, 208 and 246 to their initial operating set points. The initial set points are chosen in order to provide a minimum flow rate of water to the cooling jets to establish the swirling motion within cooling funnels 204 and 244 that facilitates the movement of slag into the smaller diameter inlets of the reverse-acting pump 230 and the hydrocyclone 252. With respect to the CSL system 200 of FIG. 7 with two reverse-acting pumps 230, 350: turn on cooling water recirculation pump 282 and open cooling water flow control valves 206, 208, 246, and 358 to their initial set points in order to facilitate movement of solids into the smaller diameter inlets of the first and second reverse-acting pumps 230, 350 and the hydrocyclone 252.

5) Control vacuum belt filter 256 and pumps 264, 308, and 312 so that the water levels in the vacuum belt filter unit 256 and the water sump 262 are automatically maintained throughout the operation of the CSL system 200.

6) With respect to the CSL system 200 of FIG. 6: as quench chamber pressure $P_0$ continues to increase to $P_{NOC}$, the controller 18 uses the input from the pressure, temperature, and flow sensors at the inlet of reverse-acting pump 230 ($P_1$, $T_1$, $F_1$) and at the inlet of the hydrocyclone 252 ($P_3$, $T_3$, $F_3$) to continuously monitor the flow rate and pressure drop through the reverse-acting pump 230 and to adjust the speed, the flow resistance, and the pressure drop ($\Delta P$) of the reverse-acting pump 230 in order to maintain $P_3$ at the desired pressure to drive the slag slurry 14 through the rest of the system downstream of the reverse-acting pump 230. With respect to the CSL system 200 of FIG. 7 with two reverse-acting pumps 230, 350: as quench chamber pressure $P_0$ continues to increase to $P_{NOC}$, the controller 18 uses data from the pressure, temperature, and flow sensors at the inlet of reverse-acting pump 230 ($P_1$, $T_1$, $F_1$), at the inlet of reverse-acting pump 350 ($P_2$, $T_2$, $F_2$), and at the inlet of the hydrocyclone ($P_3$, $T_3$, $F_3$) as input to the algorithm that calculates necessary adjustments to both pump speeds in order to apportion the flow resistance and pressure drop roughly equally between both pumps 230, 350 so that a steady hydrocyclone inlet pressure $P_3$ is maintained.

7) As quench chamber pressure $P_0$ continues to increase to $P_{NOC}$, the temperature of the slag slurry 14 and the quantity of dissolved gases within the slag slurry 14 will also increase to normal operating levels. With respect to the CSL system 200 of FIG. 6: while the reverse-acting pump 230 is capable of tolerating a significant amount of degassing within the pump, the slag slurry 14 may be degassed by downstream equipment that is specifically designed for that purpose. For example, the slag slurry 14 may preferably be degassed by downstream degassing equipment. Degassing may be done by cooling the slag slurry 14 to suppress the tendency to degas within the reverse-acting pump 230. Using inputs from the temperature sensors ($T_0$, $T_1$ and $T_3$), the pressure sensors ($P_0$, $P_1$, $P_3$, $P_4$), the flow rate sensors ($F_1$, $F_3$, $F_6$) and the gas composition sensor ($A_1$), the controller 18 uses an algorithm to calculate a cooling target temperature $T_{CT}$ to which the slag slurry 14 entering the reverse-acting pump 230 is to be cooled in order to effectively shift at least some (e.g., 20, 30, 40, 50, 60, 70, 80, 90, 95 percent or more) of the degassing from inside the reverse-acting pump 230 to inside the flash tank. With respect to the CSL system 200 of FIG. 7: while the reverse-acting pumps 230 and 350 are capable of tolerating a significant amount of degassing within the pumps, the slag slurry may 14 be degassed by downstream equipment that is specifically designed for that purpose. For example, the slag slurry 14 may preferably be degassed by downstream degassing equipment. Degassing may be done by cooling the slag slurry 14 to suppress the tendency to degas within the reverse-acting pumps 230, 350. The controller 18 may utilize inputs from the various sensors, like the controller 18 of the embodiment of the CSL system 200 of FIG. 6, and may also use data from sensors $T_2$, $P_2$, and $F_2$ as input. The controller 18 then uses the calculated cooling target temperature $T_{CT}$ to adjust the settings of cooling water flow control valves 206 and 208 to add more water to reduce the incoming slag slurry temperature below $T_{CT}$. In the event that the slag slurry temperature is already below $T_{CT}$, the computer algorithm may calculate a desired negative or reduced cooling water flow. In some embodiments, the controller 18 may not reduce the flow rate of cooling water through valves 206, 208 or 246 (or 358, in the case of the FIG. 7 configuration) below the minimum flow rate that achieves effective movement of solids through any of the cooling funnels 204, 244, 354 and into the one or more reverse-acting pumps 230, 350, and the hydrocyclone 252.

8) With respect to the CSL system 200 of FIG. 6: as the flow rate of cooling water through flow control valves 206 and 208 is increased to lower the slag slurry temperature, the total flow rate of material through the reverse-acting pump 230 will increase, as will the pressure drop ($\Delta P$). The controller 18 compensates for the increased pressure drop by decreasing the speed of the variable speed motor 86 coupled to the reverse-acting pump 230 and/or by increasing the spacing between the rotating discs. With respect to the CSL system 200 of FIG. 7: as the flow rate of cooling water through flow control valves 206 and 208 is increased to lower the slag slurry temperature, the total flow rate of material through the reverse-acting pumps 230, 350 will increase, as will the pressure drop ($\Delta P$) across each pump 230, 350. The controller 18 may decrease the speed of both variable speed motors 86 and/or decrease the spacing between the two sets of rotating discs in order to redistribute the pressure drop ($\Delta P_{TOT}$) approximately equally between the reverse-acting pumps 230 and 350.

Normal operation of the CSL systems 200 (i.e., systems illustrated in FIGS. 6 and 7) in reverse-acting pump mode may include operation during approximately times $t_4$ to $t_5$ and $t_7$ to $t_8$, as shown in FIG. 8. During normal operation, conditions within the gasifier 12 are held steady, to the extent possible, as long as the gasifier 12 is running. This means that the following process parameters are relatively constant: quench chamber pressure $P_0$, temperature $T_0$ and liquid level and the flow rate $F_1$ of slag and water into the CSL system 200. As with the embodiments of the CSL system 200 configured in the letdown turbine mode described above, the goals of the CSL system 200 configured in the reverse-acting pump mode may include, but are not limited, to maintaining a steady hydrocyclone inlet pressure $P_3$ regardless of fluctuations in quench chamber pressure $P_0$, maintaining a steady flow rate of slag slurry 14 through the CSL system 200, and maintaining a steady temperature profile through the CSL system 200 so that the majority of degassing occurs in the flash tank 270. As may be appreciated, maintaining a steady hydrocyclone inlet pressure $P_3$ may be essentially the same as maintaining a constant pressure drop ($P_1$-$P_3$) across the one or more reverse-acting pumps 230, 350. The CSL system controller 18 may maintain a steady hydrocyclone inlet pressure $P_3$ and maintain a steady flow rate of slag slurry 14 through the CSL system 200 by adjusting the speed of the one or more variable speed motors 86 and/or by adjusting the spacing between the one or more rotating sets of discs, which, in turn, adjusts the flow resistance (e.g., the pressure drop $P_1$-$P_3$) provided by the respective reverse-acting pumps 230, 350. Additionally, or in the alternative, the CSL system controller 18 may maintain a steady temperature profile through the CSL system 200 by adjusting the flow rate of cooling water to the cooling funnels 204, 244, and 354.

Occasionally the controller 18 of one of the CSL systems 200 of FIGS. 6 and 7 configured in reverse-acting pump mode will respond to an upset somewhere in the gasification plant or associated process units that impacts the respective CSL system 200. The controller 18 of the CSL systems 200 configured in the reverse-acting pump mode may respond to upsets including, but not limited, to upsets based at least in part on an increase in quench chamber liquid level, upsets based on a sudden change in quench chamber pressure $P_0$, and/or upsets based on quench chamber plugging. Other upsets (e.g., changes in slag production, changes in quench chamber temperature $T_0$) may occur relatively slowly over time and may be compensated for by the controller 18 during normal operation.

Increase in Quench Chamber Level:

When an upset in the black water system results in an increasing quench chamber liquid level, the excess water is taken out through the CSL system 200 along with the depressuring slag. In reverse-acting pump mode, this is done by decreasing the speed of the one or more reverse-acting pumps 230, 350 and/or by decreasing the spacing between the one or more sets of rotating discs in order to reduce the resistance to backflow 114. This reduced resistance decreases the pressure drop (e.g., $P_1$-$P_3$) through the one or more reverse-acting pumps 230, 350, thereby enabling the flow rate to increase until the black water system upset can be resolved. As described above with the CSL systems 200 configured in the letdown turbine mode, the controller 18 may adjust the operation of the vacuum belt filter unit 256 and the water sump 262 to handle the temporary increase in water. The controller 18 may also increase the flow rate of cooling water to cooling funnel 204 to cool down the additional incoming water to the target cooling temperature $T_{CT}$.

Change in Quench Chamber Pressure:

To compensate for a sudden drop in quench chamber pressure $P_0$, the controller 18 reduces the speed of the one or more variable speed motors 86 and/or reduces the spacing between the one or more sets of rotating discs to reduce the flow resistance and, thus, the pressure drop ($P_1$-$P_3$) through the one or more reverse-acting pumps 230, 350. This enables the gasifier 12 and the CSL system 200 to operate at a reduced pressure. Once the pressure upset is resolved, the controller 18 may reverse the changes that were made to the operation of the CSL system 200, thereby returning the CSL system 200 to normal operation.

Quench Chamber Plugging:

The embodiments of the CSL systems 200 illustrated in FIGS. 6 and 7 include a slag crusher 64, which reduces any oversize pieces of slag to sizes which are small enough to reduce plugging issues in downstream equipment. In the rare event that a large chunk of slag may enter the quench chamber 22 in such a way that the slag chunk gets stuck in the exit of the quench chamber 22 or the entrance to the slag crusher 64, the controller 18 may control the one or more reverse-acting pumps 230, 350 to reorient the slag chunk. As may be appreciated, reorienting the large slag chunk may reduce accumulation of additional slag on top of the chunk that may eventually obstruct the slag flow through the CSL system 200 unless the chunk is otherwise repositioned. For example, if the dimensions of the slag chunk are such that reorienting it with respect to the slag crusher inlet will enable the slag chunk to enter the slag crusher 64, then the CSL system 200 can help to resolve this operating event by reversing the direction of flow so that water flows from the CSL system 200 into the quench chamber 22. This redirection of flow towards the quench chamber 22 is achieved by increasing the speed of the one or more reverse-acting pumps 230, 350 to the point where backflow 114 ceases and forward flow (e.g., flow from the inlet 84 to the outlet 82) occurs. This redirection of flow towards the quench chamber 22 may dislodge the slag chunk and cause it to settle with a new orientation that will allow the slag chunk to enter the slag crusher 64. The sequence of events to carry out this reorientation operation may include the following:

1) Close valves 250, 254, and 278.
2) Approximately simultaneously increase the opening of valve 246 to accommodate higher flow, increase the speed of cooling water recirculation pump 282, and quickly increase the speed of the one or more reverse-acting pumps 230, 350 so that the recirculation pattern between the rotating discs 100, 102 closes off, backflow 114 ceases, and normal flow 110 occurs (i.e., in the direction that is opposite to the solid arrows shown on FIGS. 6 and 7, and towards the quench chamber 22). In some embodiments, the amount of cooling water delivered by recirculation pump 282 during this maneuver is at least equal to the normal flow generated by the one or more reverse-acting pumps 230, 350 through the slag crusher 64 and into the quench chamber 22. In order to accommodate the potentially significantly higher flow rate through the recirculation loop during this maneuver, several additional pieces of equipment may be installed in the recirculation loop including a control valve in parallel with valve 246 that has a larger trim size, a bypass valve around cooler 284 and a second, larger pump in parallel with recirculation pump 282.
3) Monitor the liquid level in quench chamber 22. Some additional water may be blown down to the black water system to help maintain a desired level.
4) After an appropriate amount of time (e.g., less than approximately 120, 60, 30, 15, 10, 5, 3, 2, or 1 second) has elapsed, stop the flow of water into the quench chamber 22 by quickly reducing the speed of the one or more reverse-acting pumps 230, 350 to the normal operating value by reducing the flow opening of valve 246, by reducing the speed of pump 282 and by reopening valves 250, 254 and 278. The normal operating speed of the one or more reverse-acting pumps 230, 350 is based at least in part on the size of the pump casing, the diameter of the discs 100, 102, and the spacing between the discs 100, 102, among other factors.
5) If the reorientation operation has been successful, an increase in torque in the slag crusher 64 should be registered as the slag chunk passes through. Thus, normal slag flow through the CSL system 200 should resume shortly thereafter. The above procedure may be repeated one or more additional times as needed to dislodge and reorient the slag chunk. Repeated reorientation operations may be carried out with increased flow rates relative to the initial attempt in order to generate increased hydrodynamic drag force to move the slag chunk.

When the gasifier 12 of the embodiment of the CSL system 200 illustrated in FIGS. 6 and 7 is shut down in the reverse-acting pump mode, the controller 18 may control the beginning of the shutdown operation of the CSL system 200 in a similar manner as described above for the CSL systems 200 shut down in the letdown turbine mode. For example, when the gasifier 12 is shut down, the feeds to the gasifier 12 are stopped and the production of hot syngas and molten slag cease. Then, a series of activities is completed that includes depressurizing the gasifier 12, allowing the gasification system to cool down, decreasing liquid levels, and decreasing process flow rates throughout the gasification system. All of these activities may impact the operation of the CSL system 200 during the shutdown period. In addition, residual molten slag that had accumulated on the walls of the gasifier reaction chamber 20 during operations continues to flow into the quench chamber 22 until the temperatures become too cool for the slag to flow. Thus, slag flow into the CSL system 200 continues for a portion of the gasifier shutdown period ($t_8$ to $t_9$), and then it ceases, as shown by the gray shaded area in FIG. 8. The decrease in gasifier pressure from $P_{S/D}$ to $P_F$, as shown in FIG. 8, decreases the desired pressure drop of the CSL system 200. The reduction in flow rate of fresh quench water to the quench chamber 22 reduces the flow rates of water taken through the CSL system 200 and the black water blow down system in order to maintain a steady level in the quench chamber 22. The cooling of temperatures throughout the gasification system as a result of heat loss results in cooler temperatures within the quench chamber 22. Accordingly, cooler temperature slag slurry 14 may enter the CSL system 200 during shutdown of the gasifier 12.

During shutdown of the gasifier 12, the CSL system controller 18 senses the decreasing temperatures $T_0$, $T_1$ and $T_3$ (and $T_2$, in the case of the embodiments illustrated in FIG. 7) that occur during the shutdown process, and the controller 18 reduces the flow rate of cooling water to cooling funnels 204 and 244 (and 354, in the case of the FIG. 7 configuration) in order to maintain the desired temperature profile through the CSL system 200. The gasification plant control may direct the CSL controller 18 to reduce the flow rate $F_1$ of slag slurry 14 into the CSL system 200 in order to help maintain a steady liquid level inside the quench chamber 22. In calculating the adjustment to be made to the operation of the one or more reverse-acting pumps 230, 350 during the shutdown period, the controller 18 accounts for the decreasing flow rate of cooling water through the system, the direction from the gasification plant control to reduce the flow rate of slag slurry 14 in order to help maintain the quench chamber liquid level, and the overall reduction in system pressure resulting from the depressurization of the gasifier 12. In responding to the reduced cooling water flow and the request for reduced slag slurry flow, the controller 18 may increase the speed of the one or more variable speed motors 86 and/or decrease the spacing between the one or more sets of rotating discs in order to increase the resistance to backflow 114. Increased backflow resistance in the one or more reverse-acting pumps 230, 350 decreases the flow rate through the one or more reverse-acting pumps 230, 350. In responding to the decreased driving force resulting from the decrease in quench chamber pressure $P_0$, the controller 18 may decrease the speed of the one or more variable speed motors 86 and/or increase the spacing between the one or more sets of rotating discs. The appropriate amount of decreased resistance to backflow in the one or more reverse-acting pumps 230, 350 will maintain the same flow rate through the one or more reverse-acting pumps 230, 350 in the presence of a decreased pressure driving force in the quench chamber 22. Thus, decreasing the speed of the one or more variable speed motors 86 and/or increasing the spacing between the one or more sets of rotating discs in response to decreasing system pressure to some extent counterbalances increasing the speed of the one or more variable speed motors 86 and/or decreasing the spacing between the one or more sets of rotating discs in response to the decreasing flow rate of cooling water and the direction from the gasification control to decrease the flow of slag slurry 14 into the CSL system 200. This complex counterbalancing calculation is carried out by the shutdown control algorithm in the CSL system controller 18, which adjusts the speed setting of the one or more variable speed motors 86 and/or adjusts the spacing setting of the one or more spacing actuators 120 to allow slag slurry 14 and cooling water to flow through the CSL system 200 at reduced flow rates at the same time that the overall system pressure is declining. Eventually, the slag 58 that remained in the quench chamber 22 will be depressurized through the CSL system 200. The absence of slag through the CSL system 200 may be detected by a torque sensor on the slag crusher 64, by weight sensors on the vacuum belt filter 256, by a torque sensor on the vacuum belt filter motor, or by visual inspection of the vacuum belt filter 256, or any combination thereof. Once slag flow has ceased, the CSL system 200 is turned off using the following sequence:

1) Cooling water flow control valves 206, 208, 246, 358 are closed and the cooling water circulation pump 282 is turned off.

2) If the gasifier 12 and CSL system 200 will be shortly restarted, valves 254 and 278 will be closed followed by valves 220, 250 and 222. This will preserve the liquid levels in the system for restarting. As soon as 220 is closed, the one or more reverse-acting pump motors 86 is turned off.

3) If the gasifier 12 and CSL system 200 will be shut down for extended maintenance, valve 220 will close to isolate the CSL system 200 from the gasifier 12 and the one or more variable speed motors 86 is turned off. Valves 222, 250, 254 and 278 will remain open to allow fluid to drain from the one or more reverse-acting pumps 230, 350, hydrocyclone 252, and flash tank 270 into the vacuum belt filter unit 256 and the water sump 262. Once draining is complete, all open valves are closed.

4) Pumps 264, 308, and 312 are turned off.

As may be appreciated, an alternative to the eddy current brake 238 utilized in the turbine letdown mode may include an electric generator attached to a load. Additionally, while the above embodiments of the pumps configured in the letdown turbine mode and/or the reverse-acting pump mode include rotating parallel disc pumps, other types of centrifugal pumps may be utilized. Moreover, whereas the depressurized slag slurry handling subsystem downstream of shut-off valve 250 has been shown in FIGS. 6 and 7, alternative subsystems may include, but are not limited to, a drag conveyor or a slag pit. The subsystem downstream of shut-off valve 250 may be a subsystem that dewaters the slag, captures and recycles the separated water, degases the slag-water slurry, and contains all evolved gases for treatment in a suitable handling process elsewhere in the gasification plant. Various embodiments of the subsystem downstream of shut-off valve 250 may have a target inlet pressure $P_3$ that the controller 18 maintains at a steady pressure throughout startup, normal operation, upset response, and shutdown.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A continuous slag processing system comprising:
   a first rotating parallel disc pump comprising opposing discs coupled to a first shaft, a first outlet configured to continuously receive a fluid at a first pressure, and a first inlet configured to continuously discharge the fluid at a second pressure less than the first pressure, wherein the first rotating parallel disc pump is configurable in a reverse-acting pump mode and a letdown turbine mode;
   a first motor coupled to the first rotating parallel disc pump, wherein the first motor is configured to drive the opposing discs of the first rotating parallel disc pump about the first shaft and against a flow of the fluid to control a difference between the first pressure and the second pressure in the reverse-acting pump mode; and
a first brake coupled to the first rotating parallel disc pump, wherein the first brake is configured to resist rotation of the opposing discs about the first shaft, wherein the first brake is configured to control the difference between the first pressure and the second pressure in the letdown turbine mode.

2. The system of claim 1, wherein the first brake comprises a friction brake, an eddy current brake, or any combination thereof.

3. The system of claim 1, wherein the first brake comprises an electric generator, and resisting rotation of the opposing discs about the first shaft is configured to generate electricity.

4. The system of claim 1, comprising a controller coupled to the first motor and to the first brake, wherein the controller is configured to control the first motor and the first brake based at least in part on a desired pressure of a downstream system that receives the fluid from the first rotating parallel disc pump, and the controller is configured to control the first motor and the first brake so that the second pressure is equal to the desired pressure.

5. The system of claim 1, comprising a controller configured to control a spacing between the opposing discs of the first rotating parallel disc pump.

6. The system of claim 1, comprising a controller configured to control a speed of the first motor and the opposing discs for the first rotating parallel disc pump in the reverse-acting pump mode based at least in part on a flow rate of the fluid at the first outlet, a temperature of the fluid at the first outlet, or any combination thereof.

7. The system of claim 1, comprising:
a second rotating parallel disc pump comprising opposing discs coupled to a second shaft, a second outlet configured to continuously receive the fluid at the second pressure, and a second inlet configured to continuously discharge the fluid at a third pressure less than the second pressure, wherein the second rotating parallel disc pump is configurable in the reverse-acting pump mode and the letdown turbine mode;
a second motor coupled to the second rotating parallel disc pump, wherein the second motor is configured to drive the opposing discs of the second rotating parallel disc pump about the second shaft and against a flow of the fluid to control a difference between the second pressure and the third pressure in the reverse-acting pump mode; and
a second brake coupled to the second rotating parallel disc pump, wherein the second brake is configured to resist rotation of the opposing discs about the second shaft, wherein the second brake is configured to control the difference between the second pressure and the third pressure in the letdown turbine mode, wherein the difference between the first pressure and the second pressure is equal to the difference between the second pressure and the third pressure.

8. The system of claim 1, comprising a controller configured to increase a speed of the first motor in the reverse-acting pump mode when a quantity of the fluid upstream of the first rotating parallel disc pump increases; and the controller is configured to increase a resistance of the first brake in the letdown turbine mode when the quantity of the fluid upstream of the first rotating parallel disc pump increases.

9. The system of claim 1, comprising a controller configured to increase a speed of the first motor to a first speed for a time period in the reverse-acting pump mode of the first rotating parallel disc pump to reverse the flow of the fluid to be discharged from the first outlet when the fluid flow to the first outlet from an upstream system is at least partially obstructed, wherein the controller is configured to decrease the speed of the first motor to a second speed upon lapse of the time period, wherein the time period is less than 15 seconds.

10. A gasification system comprising:
a gasifier configured to react a carbonaceous feedstock into a mixture of a gas and slag, wherein the gasifier comprises a quench chamber configured to discharge the slag via a slag outlet;
a slag crusher coupled to the gasifier, wherein the slag crusher is configured to continuously receive the slag and a quench liquid at a first pressure from the slag outlet, to reduce a size of particles of the received slag, and to form a slag slurry at a first pressure with the reduced particles of the slag and the quench liquid;
a rotating parallel disc pump comprising opposing discs coupled to a shaft, an outlet configured to continuously receive the slag slurry at the first pressure, and an inlet configured to continuously discharge the slag slurry at a second pressure less than the first pressure, wherein the rotating parallel disc pump is configurable in a reverse-acting pump mode and a letdown turbine mode;
a motor coupled to the rotating parallel disc pump, wherein the motor is configured to drive the opposing discs of the rotating parallel disc pump about the shaft and against a flow of the slag slurry to control a difference between the first pressure and the second pressure in the reverse-acting pump mode; and
a brake coupled to the rotating parallel disc pump, wherein the brake is configured to resist rotation of the opposing discs about the shaft, wherein the brake is configured to control the difference between the first pressure and the second pressure in the letdown turbine mode.

11. The system of claim 10, wherein the first pressure is greater than 136 kPa, and the second pressure is 345 kPa.

12. The system of claim 10, wherein the first brake comprises a friction brake, an eddy current brake, an electric generator, or any combination thereof.

13. The system of claim 10, comprising a controller configured to increase a speed of the motor to a first speed for a time period in the reverse-acting pump mode of the rotating parallel disc pump to reverse the flow of the slag slurry to be discharged from the outlet when the slag particles at least partially obstruct the slag outlet or the slag crusher, wherein the controller is configured to decrease the speed of the motor to a second speed upon lapse of the time period, wherein the time period is less than 15 seconds.

14. The system of claim 10, comprising a controller configured to control at least one of a speed of the motor and the opposing discs and a spacing between the opposing discs for the rotating parallel disc pump in the reverse-acting pump mode based at least in part on the first pressure, a flow rate of the slag slurry at the outlet, a temperature of the slag slurry at the outlet, or any combination thereof.

* * * * *